April 7, 1970  W. McGOVERN ET AL  3,505,648
ARITHMETIC AND LOGIC SYSTEM USING AC AND DC SIGNALS
Filed Sept. 28, 1966  13 Sheets-Sheet 2
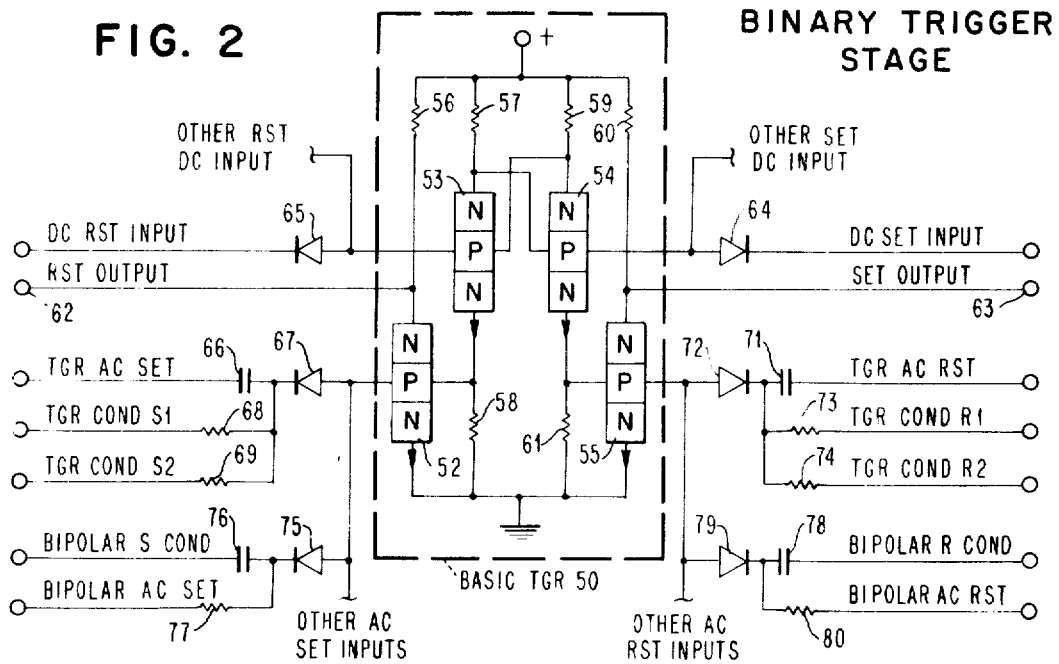
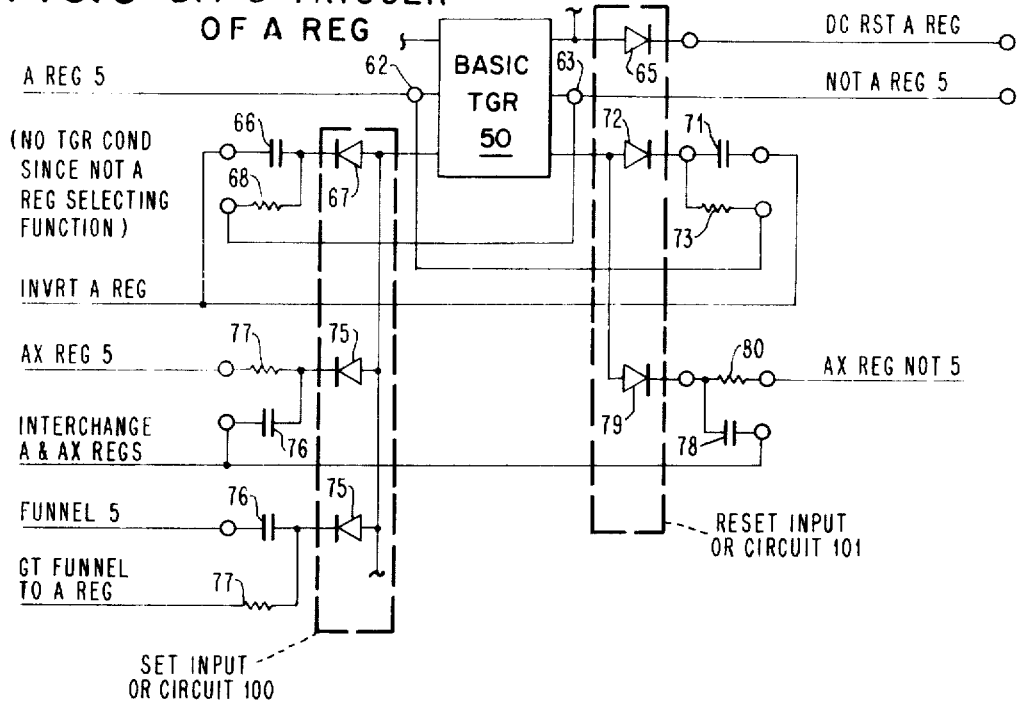

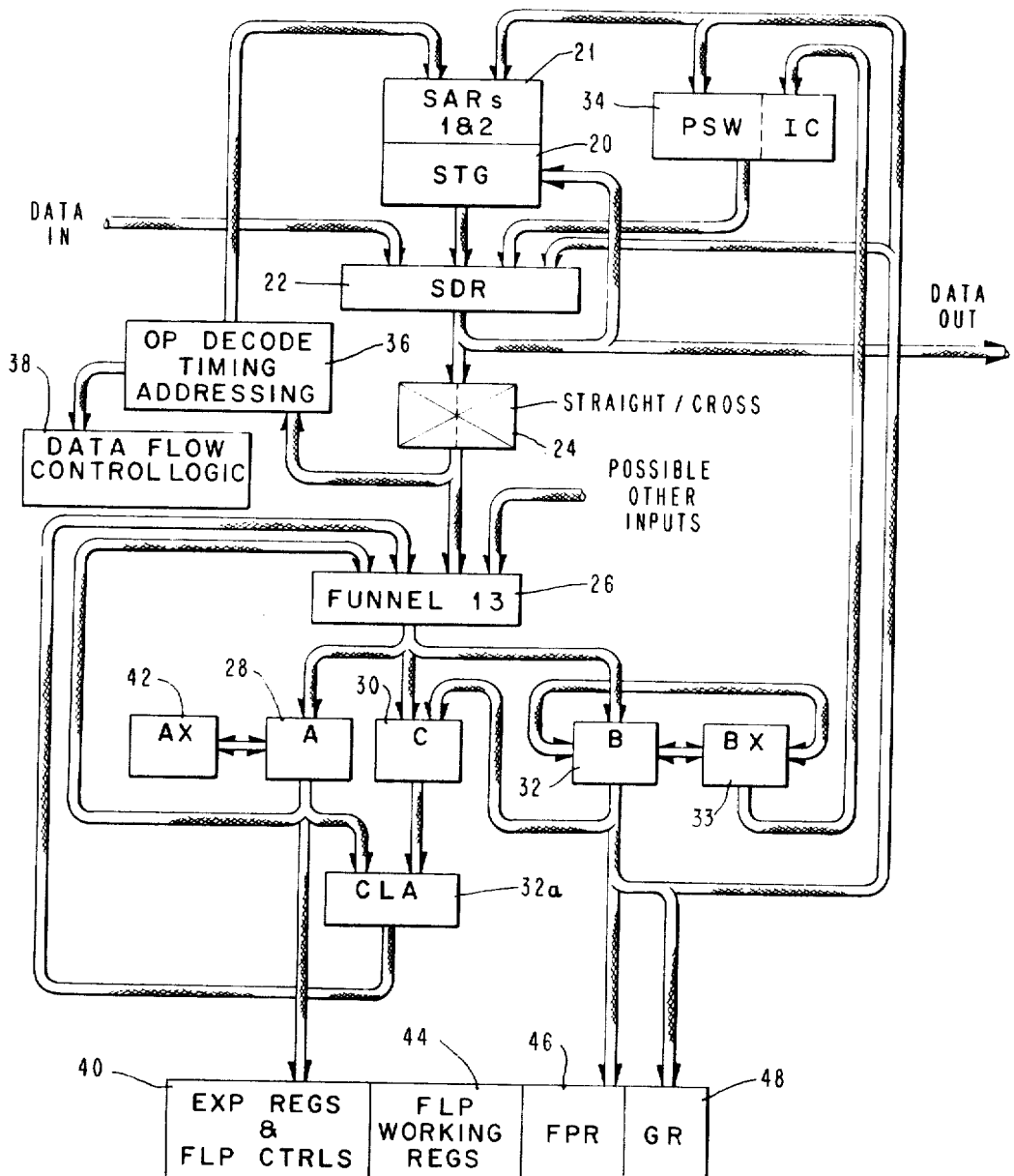

April 7, 1970  W. McGOVERN ET AL  3,505,648
ARITHMETIC AND LOGIC SYSTEM USING AC AND DC SIGNALS
Filed Sept. 28, 1966  13 Sheets-Sheet 3
FIG. 4
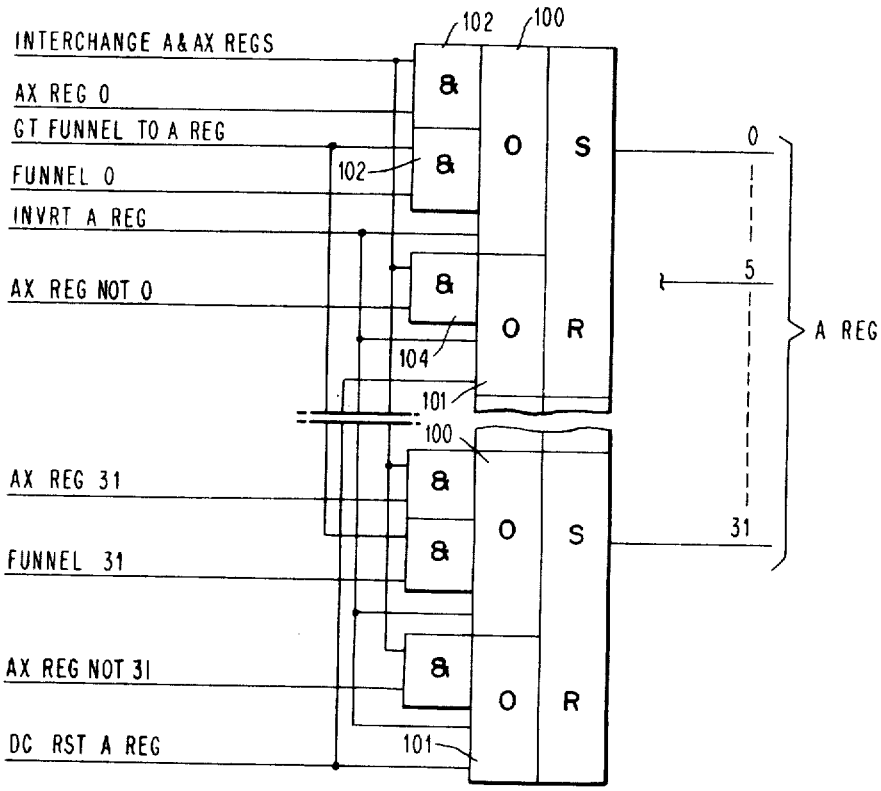
FIG. 5  BIT 5 TRIGGER OF AX REG.
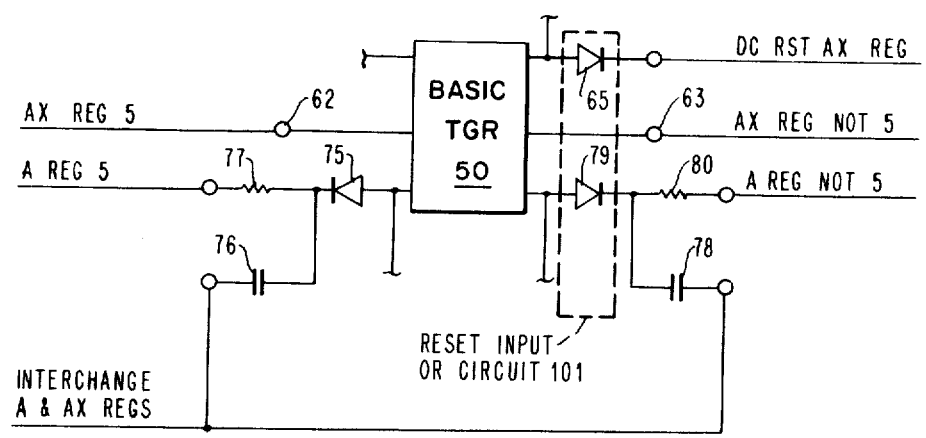

April 7, 1970  W. McGOVERN ET AL  3,505,648
ARITHMETIC AND LOGIC SYSTEM USING AC AND DC SIGNALS
Filed Sept. 28, 1966  13 Sheets-Sheet 4
FIG. 6 AX REGISTER
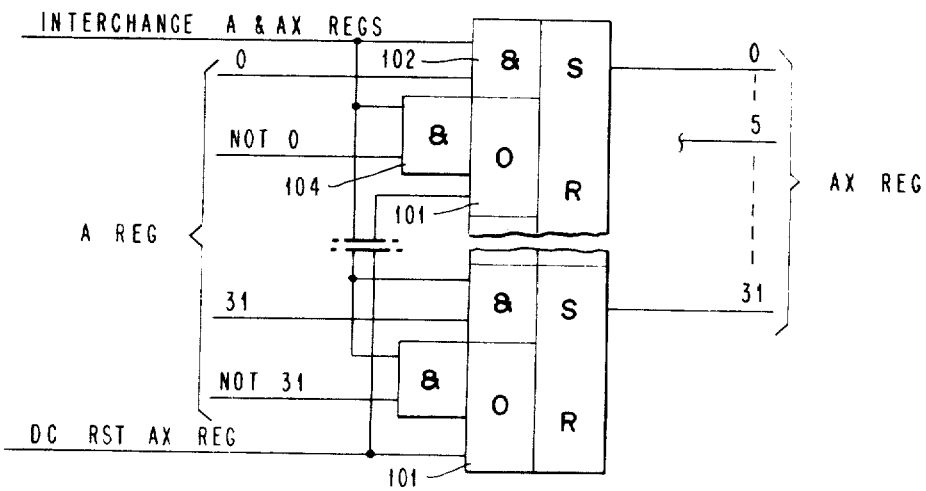
FIG. 7 BIT 5 TRIGGER OF B REG
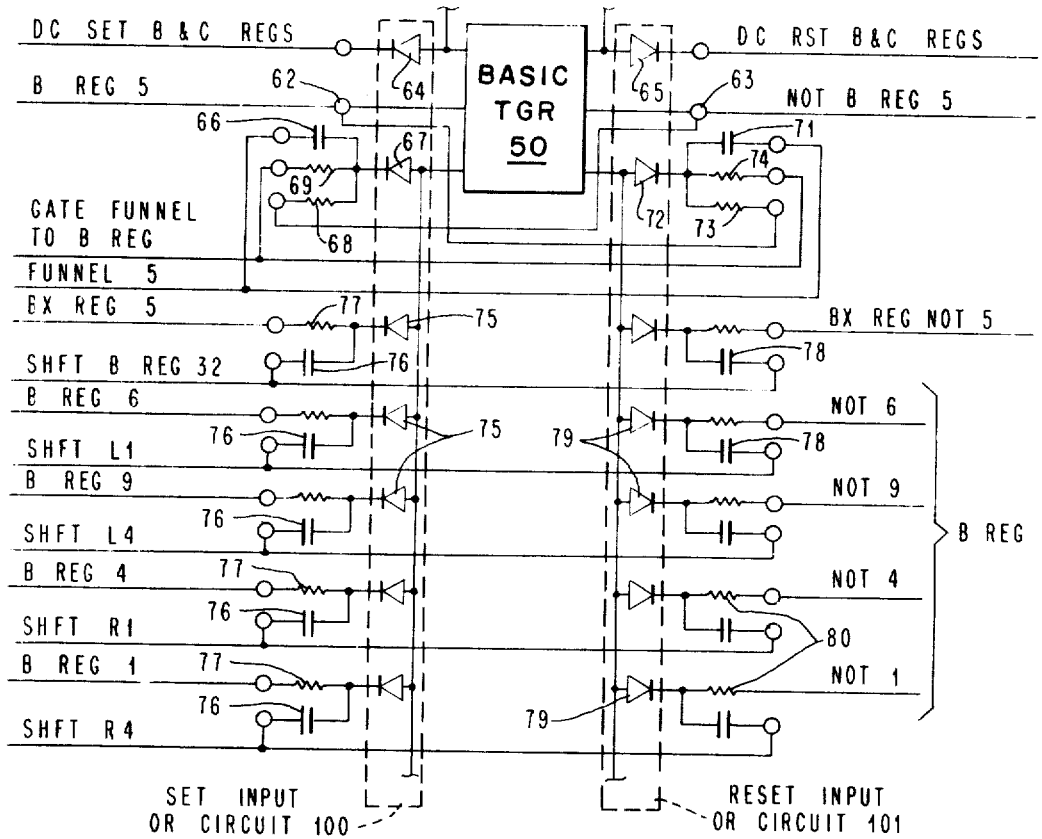

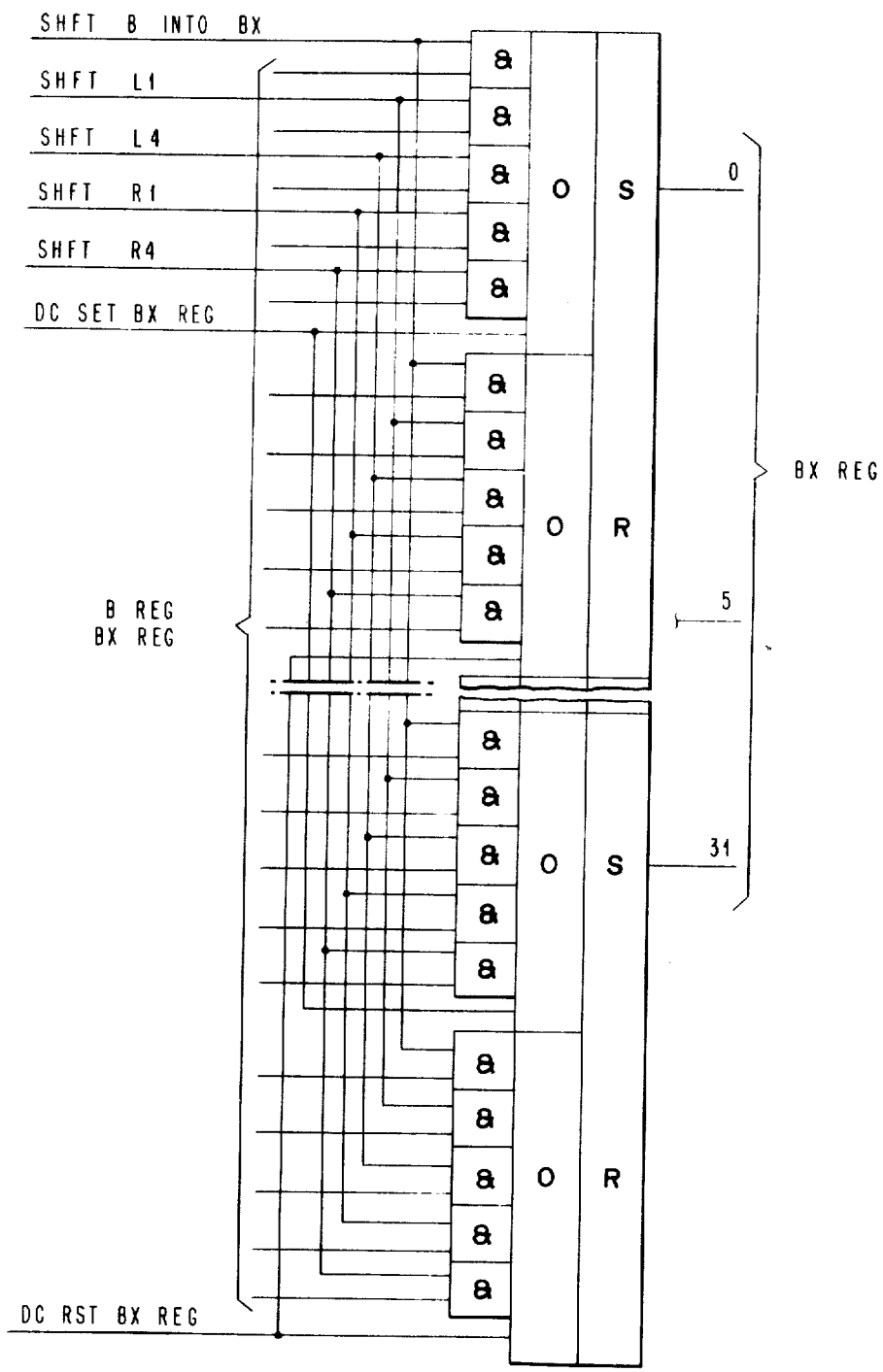
FIG. 9  BX REGISTER

FIG. 10  BIT 5 TGR OF C REG
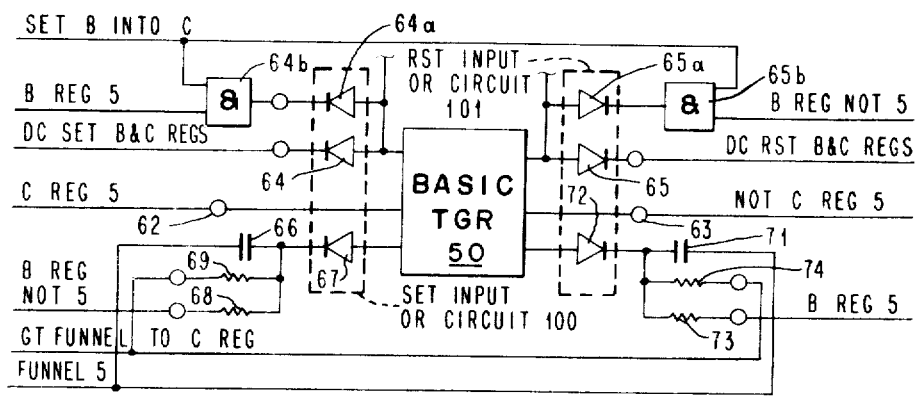
FIG. 11  C REGISTER
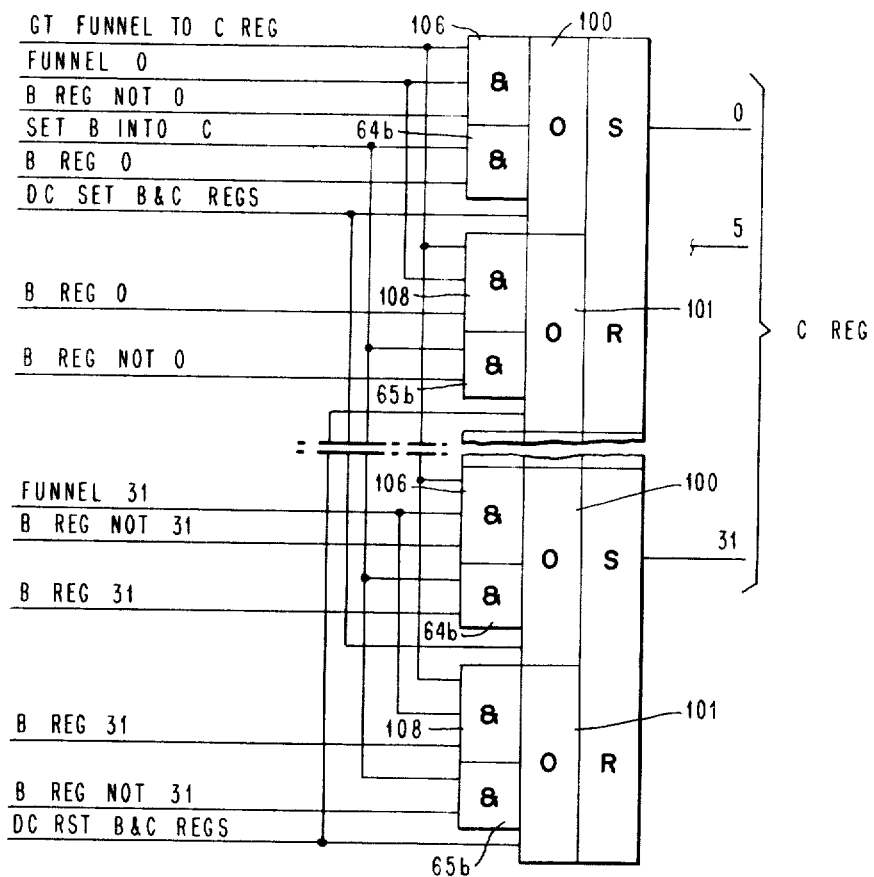

FIG. 12  STRAIGHT / CROSS
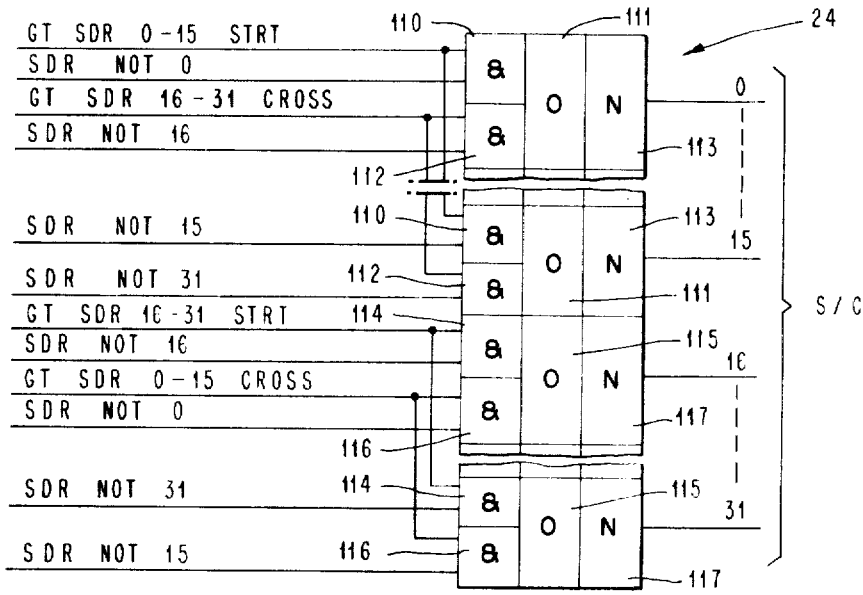
FIG. 13
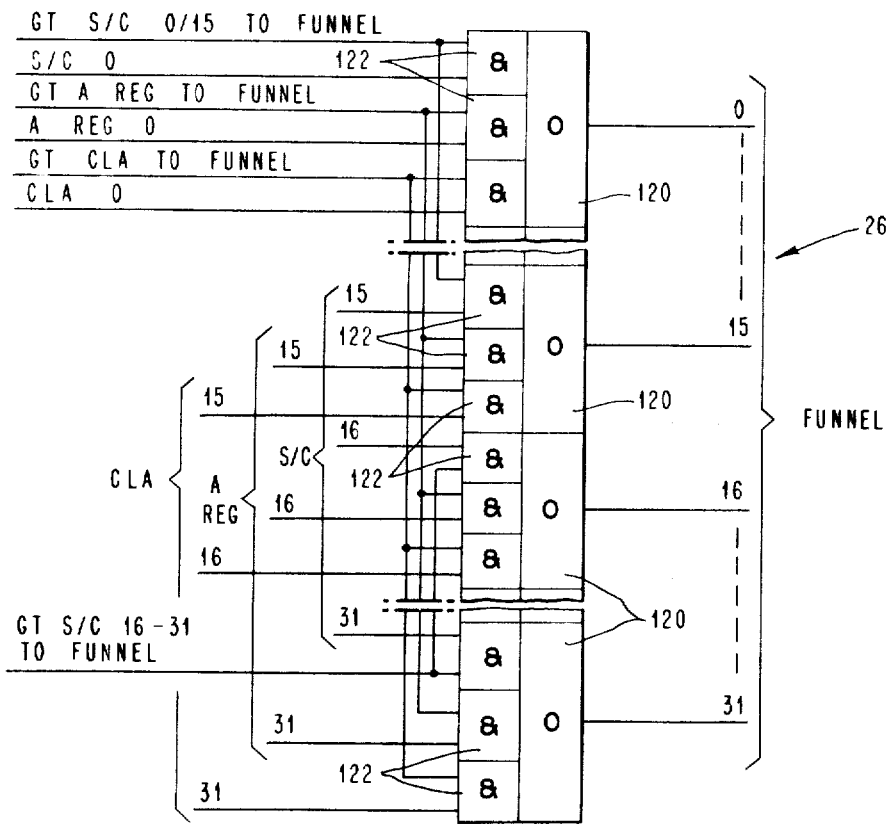

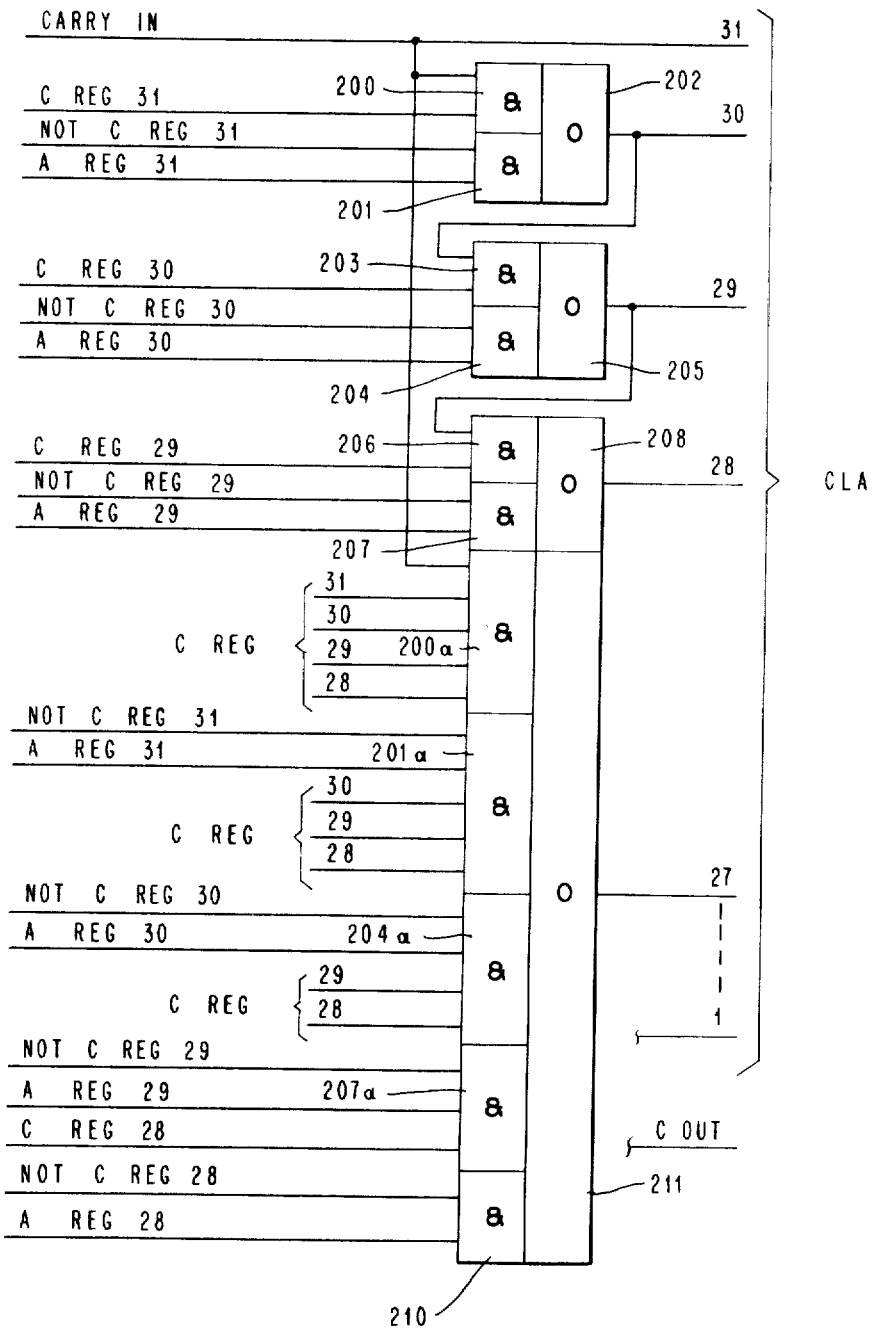
FIG. 18 CARRY GEN 3,505,648
ARITHMETIC AND LOGIC SYSTEM USING
AC AND DC SIGNALS
William McGovern, Poughkeepsie, David A. Petersen,
Wappingers Falls, and Ralph D. Ross, Poughkeepsie,
N.Y., assignors to International Business Machines Corporation, Armonk, N.Y., a corporation of New York
Filed Sept. 28, 1966, Ser. No. 582,766
Int. Cl. G06f 1/00, 7/00, 15/00; G11b 13/00
U.S. Cl. 340—172.5                    9 Claims

ABSTRACT OF THE DISCLOSURE

A data processing system has an arithmetic and logic section provided with a data flow path including a plurality of registers for performing various arithmetic logic and processing functions. The registers use triggers that can be set and reset by DC and AC signals. Different types of gates can be used with the triggers to provide OR and EXCLUSIVE-OR funcions, the gates being actuated by DC conditioning signals and AC signals. To perform arithmetic functions, the registers are associated with a carry generating system. The data flow path also includes a gate that, in the absence of a gating signal, represents all ones for use by the registers. The data flow path also includes a funnel connected to the register inputs whereby the registers are set when data appears at the output of the funnel.

SUMMARY OF THE INVENTION

This invention relates to data processing, and more particularly to an integrated data flow for performing arithmetic and shifting operations, as well as for the registering and movement of data.

In the data processing art, a typical central processing unit (CPU) of a data processing system includes registers, and data transfer paths, for the movement and handling of data manifestations. In addition, apparatus for performing arithmetic operations (add, subtract, multiply, and divide) as well as for performing logical functions (AND, OR, and EXCLUSIVE-OR) are required. Computing systems are most frequently either of the serial type wherein small units of data are handled one after the other, in series, with a relatively small amount of hardware, or of the parallel type wherein a large amount of hardware is provided so as to handle larger units of data at a much greater speed. An example of the former type is in a copending application of the same assignee entitled Data Processing System, Ser. No. 357,372, filed on Apr. 6, 1964, by G. M. Amdahl et al., now Patent 3,400,371. An example of the latter type is in a copending application of the same assignee entitled Large Scale Data Processing System, Ser. No. 445,326, filed on Apr. 5, 1965, by O. L. MacSorley et al., now abandoned in favor of continuation-in-part application Ser. No. 609,238, filed Jan. 13, 1967. Of course, variations between these two types have long been provided. However, each of these requires the separate portions of central processing unit hardware, as described hereinbefore.

In a computing system, a significant factor is what is commonly referred to as "job cost." This is a factor which relates the speed of processing data to the cost of processing data. The cost of processing is of course a function of the manufacturing cost which, in turn, is in large part controlled by the amount of actual hardware required in order to achieve a stated level of performance. It is possible that the job cost for a small serial machine may be the same as for a large parallel machine, even though the actual cost for the large machine is greater than for the small machine. However, the large mahcine may not be required by some users, and therefore the lower total cost of the small machine is advisable for such a user.

Regardless of the size of the computer, the efficiency is enhanced by the reduction of hardware only insofar as the reduction of hardware does not seriously interfere with the "throughput," or processing capability of the computer. Within a given computer application, it is possible to use a parallel yet limited data flow which may process four 8-bit bytes of data at once, but requires several cycles in order to complete an addition. Or, it may be feasible to have a complete adder that will do the arithmetic function in a single cycle but only operate on one 8-bit byte at a time. In either case, the reduction of the amount of hardware results in a reduction in speed. Thus, there is not only a serial parallel balance which may be achieved, but also it is possible to balance the nature of serial functions (small items of data being completely handled in series, or larger items of data being handled in several serial steps). The nature of the actual hardware utilized is dependent upon circuitry and circuit components which are available for use therein. Additionally, the circuitry used in one part of the apparatus must be compatible with the circuitry used in other parts of the apparatus which must cooperate therewith. Furthermore, speed is dependent upon the circuit components which may be used so that the speed of one unit may depend in part upon a hardware limitation caused by a required function of another unit. All in all, the success of a computer is highly dependent upon the circuitry of its central processing unit, and the nature of the cooperative functional units which may be provided thereby.

Therefore, a primary object of the present invention is to provide improved functional circuitry for the central processing unit of a computing system.

Other objects of the invention include the following:

Provision of a simple yet relatively high speed data flow for a central processing unit;

Provision of a central processing unit data flow within which the functional components are capable of performing a variety of functions;

Provision of a data processing apparatus capable of utilizing the transferring and registering elements of the data flow for performing the processing functions as well;

Provision of calculating apparatus capable of rapid data transfer;

Provision of improved data buffering in the data flow apparatus of a central processing unit;

Provision of improved data transfer capability utilizing a minimum of data transfer apparatus;

Provision of an improved, simple high speed arithmetic apparatus;

Provision of improved data transfer and data shifting apparatus;

Provision of central processing apparatus capable of performing general arithmetic, logic and shifting functions as well as capable of performing special functions required by the specifications of the computer;

Provision of an adder which generates carries without recourse to both operands;

Provision of data flow components capable of stable registration of data manifestations within a minimum of time following the establishment of a data configuration to which it is responsive;

Provision of improved data flow apparatus capable of sophisticated data movement at a very high speed and with a minimum of data transfer trunks;

Provision of a plural function data flow apparatus utilizing a minimum number of units, and having a minimum number of different types of units; and Provision of various improvements in data flow, arithmetic, logical and data manipulating apparatus for the central processing unit of a computer.

In accordance with a primary feature of the present invention, a plurality of binary trigger stages are arranged in different configurations so as to form manipulating registers. Each of the trigger stages is capable of operation in any one of several modes. The modes include AC binary trigger (flip-flop) operation, bipolar latch-type operation, AC setting and ordinary DC setting and resetting operations. This provides a data flow, utilizing common trigger components, which includes registers operative in different modes, thereby facilitating flexibility in a variety of operations which may be performed. One of the registers is so organized as to permit the ORing of data by utilizing the characteristics of the AC trigger in such a fashion that a DC resetting condition may be followed by a simple unipolar set. In order to perform the EXCLUSIVE OR function, a DC reset condition may be followed by a first binary trigger condition and then a second binary trigger condition during which the first setting is reversed in any order containing a ONE. The entire register is complemented in the case where all ONES are present in the data utilized to trigger the register in the second setting thereof. The shifting operations are readily performed by utilizing the bipolar latch-type setting operation among the stages of a single register, or of a plurality of registers. High speed data flow is achieved by utilizing the shifting characteristics on a full register basis so as to swap the contents of two registers at very high speeds.

In addition, the above characteristics are further utilized to enhance the operation of the apparatus in several ways in accordance with the present invention. Fast resetting of a register to all ZEROS, or high speed setting of a register to all ONES may be achieved by previously establishing the all ONES or all ZEROS condition in a related register, and using the high speed bipolar characteristics to transfer the all ONES or all ZEROS from the related register into the desired register.

In accordance with a still further aspect of the present invention, the data swapping capabilities of the apparatus herewith is utilized so as to allow one register first to act as a fast set or reset for a related working register, then utilizing that register as a buffer for contents of the working register so as to save the contents thereof for use during a later cycle without the need to transfer the contents to storage or to general purpose hardware registers remote therefrom in the data flow.

An additional feature of the present invention is the utilization of the above-described registers in the performance of arithmetic, wherein basic addition and subtraction may be utilized to form any of the basic arithmetic functions, add, subtract, multiply, and divide. Still further, subtraction is readily accomplished by utilizing the characteristics of these registers, and an additional feature of the present invention so as to provide self-complementing characteristics for operands which are to be substracted and therefore which must be added in two's complement form. Additionally, the arrangements herein provide for a simple means of repetitive arithmetic operations, such as in accumulation or in the repetive additions required in multiplication.

In accordance with a more specific object of the present invention, the response time of a binary trigger is reduced by utilizing register gating signals or other control logic as conditioning inputs for the DC portion of an AC/DC-responsive trigger gate and utilizing the data itself as the instantaneous manifestation applied to the AC portion which causes the trigger to finally cross its threshold so as to transfer from one stable condition to the other.

Other objects, features and advantages of the present invention will become more apparent in the light of the following detailed description of preferred embodiments thereof, as illustrated in the accompanying drawing.

In the drawing:

FIG. 1 is a simplified schematic block diagram of a central processing unit incorporating the integrated data flow in accordance with a preferred embodiment of the present invention;

FIG. 2 is a detailed schematic diagram of a transistorized binary trigger stage exemplary of binary triggers useful in the integrated data flow in accordance with the present invention;

FIG. 3 is a schematic diagram of the trigger of FIG. 2 arranged so as to form a bistable register stage for use in the A register of FIG. 1;

FIG. 4 is a schematic block diagram of the A register of FIG. 1 utilizing the binary trigger stage shown in FIG. 3;

FIG. 5 is a schematic diagram of a modification of the binary trigger of FIG. 2 arranged so as to form a bistable register stage for use in the AX register of FIG. 1;

FIG. 6 is a schematic block diagram of the AX register of FIG. 1 utilizing the binary trigger stage shown in FIG. 5;

FIG. 7 is a schematic diagram of a modification of the binary trigger shown in FIG. 2 so as to form a bistable register stage for use in the B register of FIG. 1;

FIG. 9 is a schematic block diagram of the BX register of FIG. 1, which comprises a plurality of binary trigger stages of the type shown in FIG. 7 except that no binary trigger input from a FUNNEL is provided in the BX register;

FIG. 10 is a schematic diagram of the binary trigger stage of FIG. 2 modified so as to form a bistable register stage for use in the C register of FIG. 1;

FIG. 11 is a schematic block diagram of the C register of FIG. 1 utilizing a plurality of trigger stages of the type illustrated in FIG. 10;

FIG. 12 is a schematic block diagram of a STRAIGHT/CROSS circuit for use in the embodiment of FIG. 1;

FIG. 13 is a schematic block diagram of a FUNNEL for use in the embodiment of FIG. 1;

FIG. 18 is a simplified schematic block diagram of a carry look ahead mechanism for use in the embodiment of FIG. 1.

Figure 8:
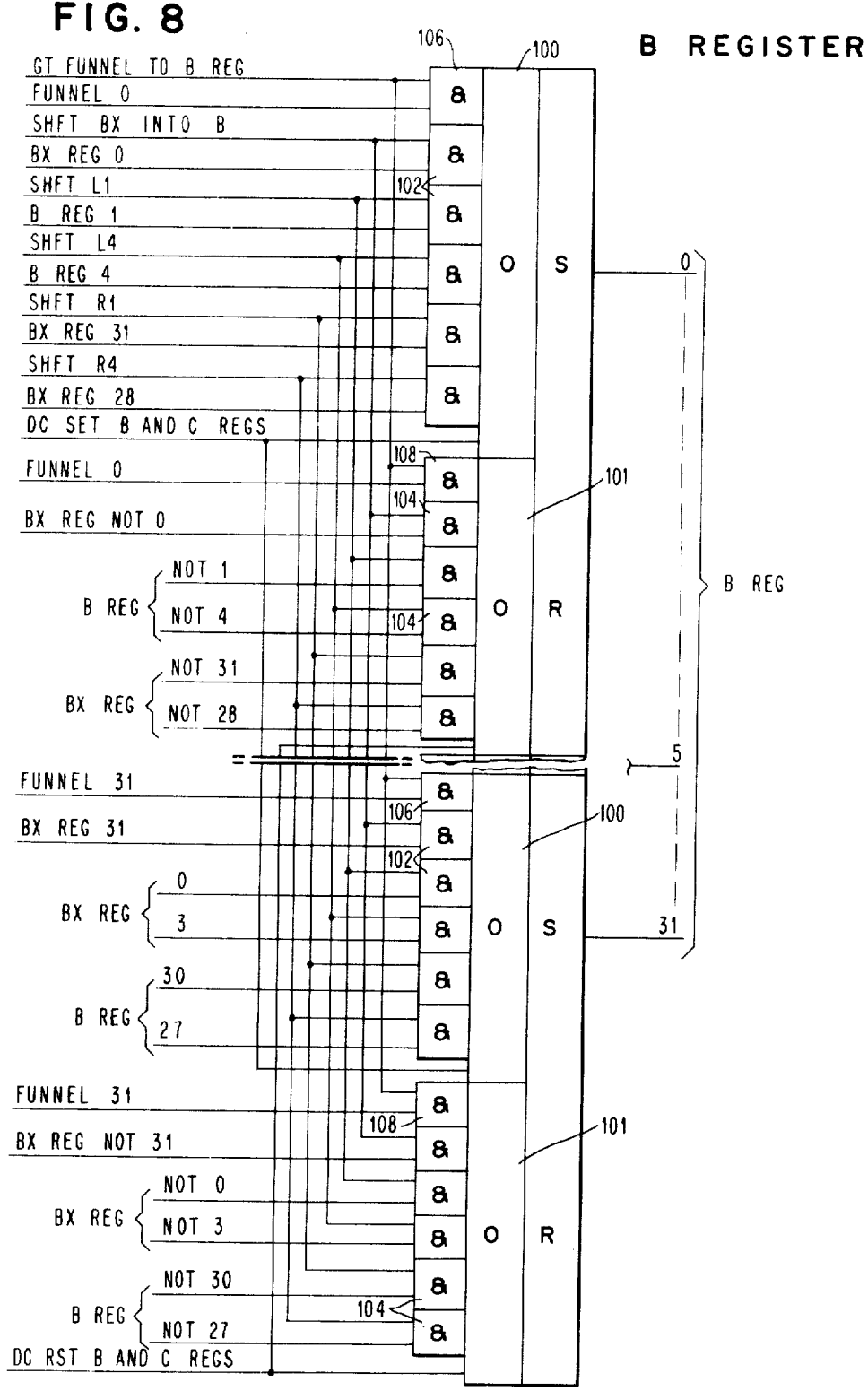
FIG. 8 is a schematic block diagram of the B register of FIG. 1 comprising a plurality of register stages as shown in FIG. 7.

The present invention is shown within an environment of a data processing system which is in accordance with the architectural definition of a data processing system set forth in a publication of the International Business Machines Corporation entitled "IBM System/360 Principles of Operation," IBM Form No. A22–6821, copies of which are available in the Scientific Library of the United States Patent Office. This system is also described and shown in large and small environments, respectively, in said aforementioned copending applications of Amdahl et al. and MacSorley et al. The present invention, however, is shown herein in a simplified form, so as to present the characteristics of the invention without the need for an unduly complicated description of the environment within which it may be set. Furthermore, storage-to-storage, byte-at-a-time variable field length operations are not contemplated herein.

In brief, the central processing unit, within which elements of the present invention may be embodied, may include a storage device 20 (STG) which may be operated by appropriate associated storage address registers 21 (SAR 1, SAR 2). The storage 20 feeds a storage data register 22 (SDR) which in turn passes data to a STRAIGHT/CROSS mechanism 14 (which is referred to sometimes hereinafter by the abbreviated term "S/C"). THE STRAIGHT/CROSS mechanism 24 feeds data to a FUNNEL 26 which in turn feeds the A, B, and C registers 28, 30, 32. The A and C registers 28, 30 feed a carry look ahead mechanism 32a (CLA), the output of which is returned to the FUNNEL 26. The output of the B register 32 is applied to the storage data register 22, the SAR's 21, and to a program status word register 34 (PSW) which includes an instruction counter portion (IC) that is set by a BX register 33. The storage data register 22 is also responsive to the PSW register 34 and to data coming into the central processing unit over a DATA IN bus. The storage data register can apply data manifestations to the storage 20 and to remote parts of the system over a DATA OUT bus.

For clarity in presenting the invention, general control of the system has been simplified because the exact nature of the particular control system used is not germane to the present invention, any control configuration capable of sequencing the operation of the central processing unit being adaptable for use herewith. The usual form of operation decoding, timing, and addressing are required as is shown in block form at 36 in FIG. 1. Additionally, exemplary data flow control logic 38 is shown briefly in FIG. 1 and illustrated in detail in FIGS. 14–17.

The output of the A register 28 is also applied to the FUNNEL 26 and to exponent registers and floating point arithmetic controls 40. The A register is additionally in a data transfer relationship with an AX register 42 so as to permit transfer of the contents of the A register to the AX register concurrently with transfer of the contents of the AX register to the A register, in accordance with one of the aspects of the present invention. The floating point circuitry at the bottom of FIG. 1 is further illustrative of floating point working registers 44 and general floating point registers 46 (FPR), all of which is illustrated only briefly inasmuch as it is unconcerned with the embodiment of the present invention. Floating point registers 46 are fed by the output of the B register, as are general purpose registers 48 (GR). The floating point registers and general purpose registers are addressable by the program in accordance with the architectural definition of a data processing system set forth in the aforementioned copending applications of Amdahl et al. and MacSorley et al., and in the before-described Principles of Operation Manual.

Functions of the various portions of the apparatus in FIG. 1 are described hereinafter, following the detailed description of the specific hardware shown therein, in relation to typical operations which the apparatus is adapted to perform, in accordance with various aspects of the present invention.

Referring now to FIG. 2, the configuration of a basic bistable stage or trigger 50 is shown to comprise four transistors 52–55 and six resistors 56–61. The transistors 52, 53 and resistors 56–58 comprise one side of the bistable element formed by the basic trigger 50, and the transistors 54, 55 and resistors 59–61 comprise the other side of the bistable element formed by the basic trigger 50. For convenience, when the left side of the basic trigger system 50 is conducting, the device is defined to be "set," which also may be considered to be ON, or which represents a binary data value of ONE. Similarly, conduction in the right side of the basic trigger 50 (as shown in FIG. 2) is taken as a "reset," OFF, or ZERO state. The basic trigger 50 is operated in response to a plurality of inputs, there being three different types of inputs for both setting and resetting of the trigger. These inputs will respond to negative levels of voltage, or negative shifts in voltage in the case of certain inputs, so as to cause the setting, or resetting, of the basic trigger 50. This is due to the fact that, as shown in FIG. 2, the basic trigger 50 comprises NPN transistors which are connected between a positive source and ground. Of course, positive voltage inputs could be used to control the circuit if PNP transistors were connected in a configuration between a negative potential and ground. Similar other different arrangements for different polarities and voltage levels may be implemented by those skilled in the art. It is to be understood that the detailed nature of the basic trigger configuration 50 is not germane to the present invention, any such circuit capable of responding in a manner so as to fulfill the operation described hereinafter being sufficient.

The basic trigger 50 operates essentially as two cross-coupled amplified stages, as follows:

The control elements of the triggers are the transistors 53, 54, each relating to one side of the binary stage. The transistors 53, 54 are not allowed to saturate, and they change from substantially non-conduction to conduction within a very narrow range of applied base potentials. The small transition produced by either transistor 53, 54 is amplified and maintained stable by a related output transistor 52, 55. When transistor 53 is on, transistor 52 is forward biased by the potential across resistor 58, and transistor 52 turns on. The base of transistor 54 will also be positive, having the same potential as the collector of transistor 53, so it will be forward biased, but less so than if transistor 53 were not conducting; this holds the base of transistor 55 close to zero, so that it does not conduct. This is the stable ON or SET condition, because with transistor 52 conducting, the RST OUTPUT line connected to terminal 62 is negative, and with transistor 55 non-conducting, the SET OUTPUT line connected to terminal 63 is positive.

In order to reset, or turn off the binary trigger stage of FIG. 2, a negative input of sufficient voltage must be applied to the base of transistor 53 or to the emitter of transistor 54. The arrangement of FIG. 2 permits a single DC negative potential to pass through diode 65 (and it is similar for diode 64), thus to cut off transistor 53. With transistor 53 cut off, there is no forward-bias voltage developed in resistor 58 so transistor 52 also will cut off. This causes the RST OUTPUT to swing positive. When transistor 53 cuts off, it allows a full positive potential at its collector, which is also applied to the base of transistor 54. This causes transistor 54 to conduct, developing a positive potential at the base of transistor 55 across resistor 61. Thus, transistor 55 becomes forward biased and conducts, causing the SET OUTPUT to swing negative. The same result is achieved by applying a sufficient negative potential via diode 72 or diode 79 to the emitter of transistor 54.

Again considering the trigger stage of FIG. 2 to be in the SET or ON state, if a DC condition is applied to resistors 73, 74 and then an AC data signal is applied to the capacitor 71, a negative potential will pass through the diode 72 to the emitter of the transistor 54. This is because the anode of the diode 72 is connected directly to the junction of the resistor 61 with the emitter of transistor 54 (even though the mode of drawing used in FIG. 2 may suggest that the base of the transistors 52, 55 have two separate connections thereto, this is merely a short form notation for the fact that the anodes of the diodes 72, 79, the base of the transistor 55, the emitter of the transistor 54, and the ungrounded end of the resistor 61 are all connected together). When the negative potential passes through the diode 72 to the emitter of the transistor 54 this causes the emitter to be sufficiently negative relative to the base of the transistor 54 that the transistor 54 will commence conduction, causing a negative voltage drop across its collector resistor 59 which is coupled to the base of the transistor 53 thereby cutting off the transistor 53. At the same time, conduction of current through the transistor 54 will cause a forward biasing potential to be developed across the resistor 61 so that transistor 55 will turn on. A similar effect takes place with the turn off of transistor 53, the forward bias developed across resistor 58 is lost so that transistor 52 no longer conducts. Thus the stable condition is transferred from SET to RESET by application of a negative potential to the diode 72. A similar result would be achieved by applying negative potentials to the elements 78–80.

The gating inputs connected to the diodes 72, 79 (and the same is true of the elements 66–69 and 75–77) are time dependent. Thus if negative potentials are applied to resistors 73, 74 so as to condition the apparatus for resetting, there will be a potential drop from the terminal with "TGR COND R1" and terminal "TGR COND R2" most negative, the junction of the resistors 73, 74 with the capacitor 71 will be halfway between negative and positive, and the terminal marked "TGR AC RST" will be most positive. Then if a negative AC signal is applied to the terminal of the capacitor 71, this immediately permits the potential at the cathode of the diode 72 to drop to a sufficiently low value to permit forward biasing of the transistor 54 as described hereinbefore.

It should be noticed, as is described with respect to the various registers formed from the binary trigger stage of FIG. 2 hereinafter, that the various inputs thereto may be connected in a variety of configurations, which is one of the aspects of the present invention. Further, the number of inputs which may be used is limited only by the power and frequency response characteristics which pertain to any particular embodiment of the binary trigger suitable to the needs of any specific design wherein the present invention is to be utilized. Thus, for example, although the B register has a large number of bipolar inputs, the A register has one bipolar input; the A, B, and C registers have AC binary trigger inputs; on the other hand, the AX register has only a single bipolar input along with a DC reset input. The configuration of the binary trigger stage of FIG. 2, as it is utilized in the various registers which are shown in FIG. 1, is described in detail with respect to each of the registers in the following paragraphs.

The trigger configuration used in the A register is shown, in simplified form, in FIG. 3, wherein only those inputs which are actually used are illustrated. The configuration of FIG. 3 relates to bit 5 of the A register, for example only. Each of the stages of the A register (as shown in FIG. 3) utilizes the binary trigger input 66–68, 71–73 as a high speed inverting input by having the resistors 68 and 73 connected to the output terminals 63 and 62 respectively of the opposite sides of the basic trigger 50, and by applying an AC signal on an INVRT A REG line to the capacitor 66, 71. This is possible since no particular register need be selected, and therefore a general conditioning line need not be used. Although the resistor elements 69, 74 (FIG. 2) are not shown in FIG. 3, these could be tied to appropriate negative potentials so as to provide suitable conditioning at all times, or the potentials in the circuitry could be adjusted utilizing a single register as shown in FIG. 3; or both resistors of an input could be applied to the opposite output; it is immaterial to the invention which method is utilized. The A register trigger of FIG. 3 utilizes the bipolar inputs 75–77, 78–80 so as to cause each bit of the A register to respond to a corresponding bit of the AX register in response to a gating signal applied on an INTERCHANGE A & AX line. Notice that the general conditioning line (INTERCHANGE A & AX) is applied to the capacitor 76, 78 and therefore comprises the AC input to the trigger. In other words, a negative shift on this line will cause data (which is standing at the resistor inputs) to be set into the A register trigger stages. The resistors 77, 80 are fed by corresponding outputs of bit 5 of the AX register (the outputs comprising the equivalent to the terminals 62, 63). When a signal is applied on the INTERCHANGE A & AX REGS line to the capacitor 76, 78, this will cause operation of one of the transistors 52 or 55 (depending upon the state of the AX REG) even while the transistors 53, 54 of the A register are causing a similar response in the AX register. On the other hand, a second bipolar input to the set side only of the A register trigger shown in FIG. 3 has a conditioning line applied to the resistor 77 and has a data input line applied to the capacitor 76. Thus, whenever a signal is present on the GT FUNNEL TO A REG line, then a signal on the FUNNEL 5 line applied to the capacitor 76 will cause the setting of bit 5 of the A register (or will attempt to set it if it had previously been set). In addition, the A register may be reset by application of a signal on the DC RST A REG line to the diode 65 which pulls all of the trigger stages over to the reset side.

The representation of the A register in FIG. 4 is a simplification of a plurality of stages of the type illustrated in FIG. 3. The relationship between FIG. 4 and FIG. 3 is illustrated by the SET INPUT OR CIRCUIT 100 and the RESET INPUT OR CIRCUIT 101. The elements 76 and 77 comprise a set input AND circuit 102, and the elements 78, 80 comprise a reset input AND circuit 104. Thus, signals applied to the element 66, 68, 76, and 77 will cause operation through the OR circuit 100, whereas signals applied to the elements 65, 71, 73, 78, and 80 will be applied to the reset input OR circuit 101. Of course, in the representation of FIG. 4, a signal on the INVRT A REG line will either operate the set input OR circuit 100 or the reset input OR circuit 101 to an effective conclusion, depending on whether the trigger was previously reset or set, respectively. Bits 0 and 31 of the A register are shown in FIG. 4: The remaining bits are identical with the exception of the actual data bit positions applied as data inputs thereto. Thus, the binary trigger as configured in FIG. 3 provides an A register as shown in FIG. 4 which can be DC reset, can be inverted, can be set in response to corresponding funnel bits, or can be selectively set and reset in response to an interchange of data between the A and AX registers.

In FIG. 5, the AX register is much simpler than the A register in that it only has a DC reset, two outputs, and an AC conditioned bipolar relationship with the A register three elements 75–77 and 78–80. This configuration however operates in an identical fashion with the corresponding portions of the A register shown in FIGS. 3 and 4. The representation of the AX register, broken away between bits 1 and 30, is shown in FIG. 6 in a fashion similar to the A register representation of FIG. 4. The elements 76 and 77 comprise a set input AND circuit 102 (FIG. 6), and the elements 78 and 80 comprise a reset input AND circuit 104.

A binary trigger configuration relating to bit 5 of the B register is shown in FIG. 7. This comprises a basic trigger with both DC set and DC reset inputs, with a binary trigger input, and with five bipolar inputs on each of the set and reset sides. It comprises the same general trigger as shown in FIGS. 2, 3, and 5, but the usage of the inputs differs from those shown with respect to the A and AX registers in FIGS. 3 and 5. Specifically, the B register used both resistors 68, 69 and 73, 74 in conjunction with the related capacitor 66, 71 in forming three way input circuits such that an AND circuit is provided for triggering, even though the resistors 68, 73 are tied back to the outputs 63, 62, respectively. Additionally, although capacitor 66 in FIG. 3 is connected to a general control line for the whole A register, which control line will cause the state of each trigger to reverse, the B register of FIG. 7 uses a DC conditioner applied to the resistors 69, 74 so that, as data appears at the output of bit 5 of the FUNNEL, this data will cause either the capacitor 66 or the capacitor 71 to trigger a related transistor and reverse the state of the basic trigger 50, in dependence upon whether the trigger was previously set or reset. The bipolar inputs comprising the elements 75–77 and 78–80 in FIG. 7 are connected to successive different outputs of the B register or the BX register in accordance with the number of columns of shifts called for by a related control line. The B and BX registers are connected in a wraparound fashion in the present embodiment so as to permit shifting either right or left, either one or four bits, or shifting the entire contents of B to BX, and vice versa, by means of a 32-bit shift. This is controlled by applying corresponding bits of the B and BX register to resistors 77, 80, and by gating the contents of the related stages of B and BX into the B register by means of appropriate shift signals: SHFT B REG 32, SHFT L1, SHFT L4, SHFT R1, and SHFT R4. The diodes 64, 67, and 75 comprise a set input or OR circuit 100 and the diodes 65, 72, and 79 comprise a reset input OR circuit 101, as shown in FIG. 8. Each combination of a capacitor 76 and a resistor 77 comprises an input set AND circuit 102, and each combination of a capacitor 78 and resistor 80 comprises an input reset AND circuit 104. In a similar fashion, the capacitor 66 in combination with the resistor 69 provides an AC trigger set input AND circuit 106 and the capacitor 71 in combination with the resistor 74 provides an AC trigger reset input AND circuit 108. Thus, the B register shown with bits 1–30 broken away in FIG. 8, comprises a plurality of stages, each of which: may be DC set or DC reset; may be triggered to an opposite side in dependence upon an input from the FUNNEL; or may be set in a bipolar fashion in correspondence with a related bit of the B register or of the BX register in response to any one of five different shift control signals.

The BX register shown in FIG. 9 is identical to the B register except for the fact that there is no binary trigger input thereto: In other words, the BX register is not responsive to the FUNNEL, but is responsive to appropriate outputs of the B and BX register in an exactly complementary fashion to the connection of inputs to the various stages of the B register. Therefore further discussion is believed to be unwarranted.

In FIG. 10 the C register is shown to comprise a variation which includes two methods of DC set and DC reset and a variation in the AC trigger set and reset controls. Conventional DC set and DC reset are applied by means of the DC SET B & C REGS and DC RST B & C REGS lines applied to the diodes 64, 65 respectively. An additional set and reset is provided by diodes 64a and 65a which are operated by corresponding AND circuits 64b, 65b. These AND circuits are responsive to related bits of the B register and to a signal on the SET B INTO C line. The AC trigger input to the various stages of the C register is also different because of the fact that the resistors 68, 73 are applied to the related outputs 63, 62 respectively of the like-numbered bit of the B register, rather than being tied back to the same bit position of the C register. The reason for this is that under certain operating conditions, the content of B is set into C, and then the A register is applied to both B and C. C has not had time to stabilize its outputs sufficiently to guarantee accurate binary trigger action, so C uses the same condition, as it is established in B, to cause the binary trigger action. The C register is shown in FIG. 11, and the relationship of the C register in FIG. 11 to the stage of the C register shown in FIG. 10 is the same as appertains to the B register with respect to FIGS. 7 and 8, hereinbefore.

The STRAIGHT/CROSS mechanism 24 of FIG. 1 is shown in detail in FIG. 12. Therein, two groups of data bits from the storage data register 22 are gated independently. Bits 0–15 may be gated straight, and bits 16–31 may not be gated; conversely, bits 16–31 may be gated straight and bits 0–15 not gated at all. On the other hand, both sets may be gated straight or both sets may be gated cross or either set may be gated cross alone. The logic of the STRAIGHT/CROSS mechanism is inverted, in the sense that the *complement* of a given bit in the SDR is monitored, and if the complement *is* present, then the *true* manifestation of the bit in FIG. 12 will not be generated. The reason for this is that the STRAIGHT/CROSS mechanism has the ability to generate all ONES, for use in the data flow of FIG. 1, at any time that the gating lines which relate to the transferring of data from the storage data register through the STRAIGHT/CROSS mechanism are *not* energized. In other words, when the STRAIGHT/CROSS mechanism is not being used for its primary purpose, it automatically generates all ONES at the input to the FUNNEL for a transfer to any of the registers A, B, C. This is described in greater detail with respect to the description of exemplary operations, hereinafter.

In operation, the STRAIGHT/CROSS mechanism shown in FIG. 12 is not monitored for data from the SDR except when an appropriate gating signal is raised. Thus there must be a signal on any one of the following four lines before the data significance at the output of the STRAIGHT/CROSS mechanism is taken to relate to the data content of the SDR; GT SDR 0–15 STRT; GT, SDR 16–31 CROSS; GT SDR 16–31 STRT; and GT SDR 0–15 CROSS. It can be seen that a plurality of AND circuits 110 respond to the signal on the GT SDR 0–15 STRT line to gate related ones of the complements of bits 0–15 of the SDR straight through the mechanism so as to present these on corresponding lines at the output of the STRAIGHT/CROSS mechanism. Similarly, the outputs 0–15 may instead be energized by complements of bits 16–31 of the SDR when a signal is generated on the GT SDR 16–31 CROSS line, due to the operation of a plurality of AND circuits 112. The STRAIGHT/CROSS mechanism may be energized at bits 16–31 in response to complements of bits 16–31 of the SDR whenever there is a signal present on the GT SDR 16–31 STRT line at the input of a plurality of AND circuits 114. In a corresponding fashion, AND circuits 116 will gate complements of bits 0–15 of the SDR through to STRAIGHT/CROSS bits 16–31 in response to a signal on the GT SDR 0–15 CROSS line. Taking the AND circuits 110 as an example, whenever the SDR data is to be monitored, or passed through the STRAIGHT/CROSS circuit for use by the remainder of the circuitry herein, the signal on the GT SDR 0–15 STRT line will enable each of the AND circuits 110 to operate. Thus, if there is a signal present on one of the bit lines such as SDR NOT 0, the AND circuit 110 will operate and will cause a related OR circuit 111 to operate. This in turn will cause an inverter 113 to generate *no* signal so that the absence of the bit will be manifested at the output of the STRAIGHT/CROSS circuit. On the other hand, if SDR bit 0 is a ONE (in other words SDR 0 is present and there is no signal on the SDR NOT 0 line), then there will be no output from the AND circuit 110 and therefore none from the OR circuit 111 so that the inverter 113 *will* generate an output. In a similar fashion, if there are no gating lines generated at the inputs of the AND circuits 110, 112, 114, 116, then all of the inverters 113, 117 will generate signals; this means that the STRAIGHT/CROSS mechanism, when in a quiescent state, generates all ONES in bits 0 through 31. These ones may be used as data to be applied to the registers in order to form the EXCLUSIVE OR with previously established data in the registers so as to cause the complementing of that previously established data, and are also used to expand halfword operands. The usage of this feature is described with respect to the operation of the data flow in accordance with the present invention, hereinafter.

The FUNNEL 26 is shown in detail in FIG. 13. This is a simple gating circuit which merely permits selecting data from among a plurality of sources and applying that data to a plurality of destinations (A, B, and C REGS). Signals are generated at the output of the FUNNEL representing any one of 32 data bits (0–31) in response to a plurality of OR circuits 120. Each of the OR circuits 120 is fed by a plurality of related AND circuits 122, each of which relates to a different one of the three sources. Thus there is a set of thirty-two AND circuits corresponding to each of the following lines: GT S/C 0–15 TO FUNNEL, GT A REG TO FUNNEL, GT CLA TO FUNNEL, and GT S/C 16–31 TO FUNNEL. The gate from the STRAIGHT CROSS mechanism is split as between bits 0–15 and bits 16–31 so as to selectively respond only to data which is valid as it passes through the STRAIGHT/CROSS mechanism. The generation of these gating lines, and their relationship to permitting only valid data or selected all ONES to be passed through the STRAIGHT/CROSS mechanism to the FUNNEL is described with respect to the control logic circuit of FIGS. 14 and 17, hereinafter.

Figure 14:
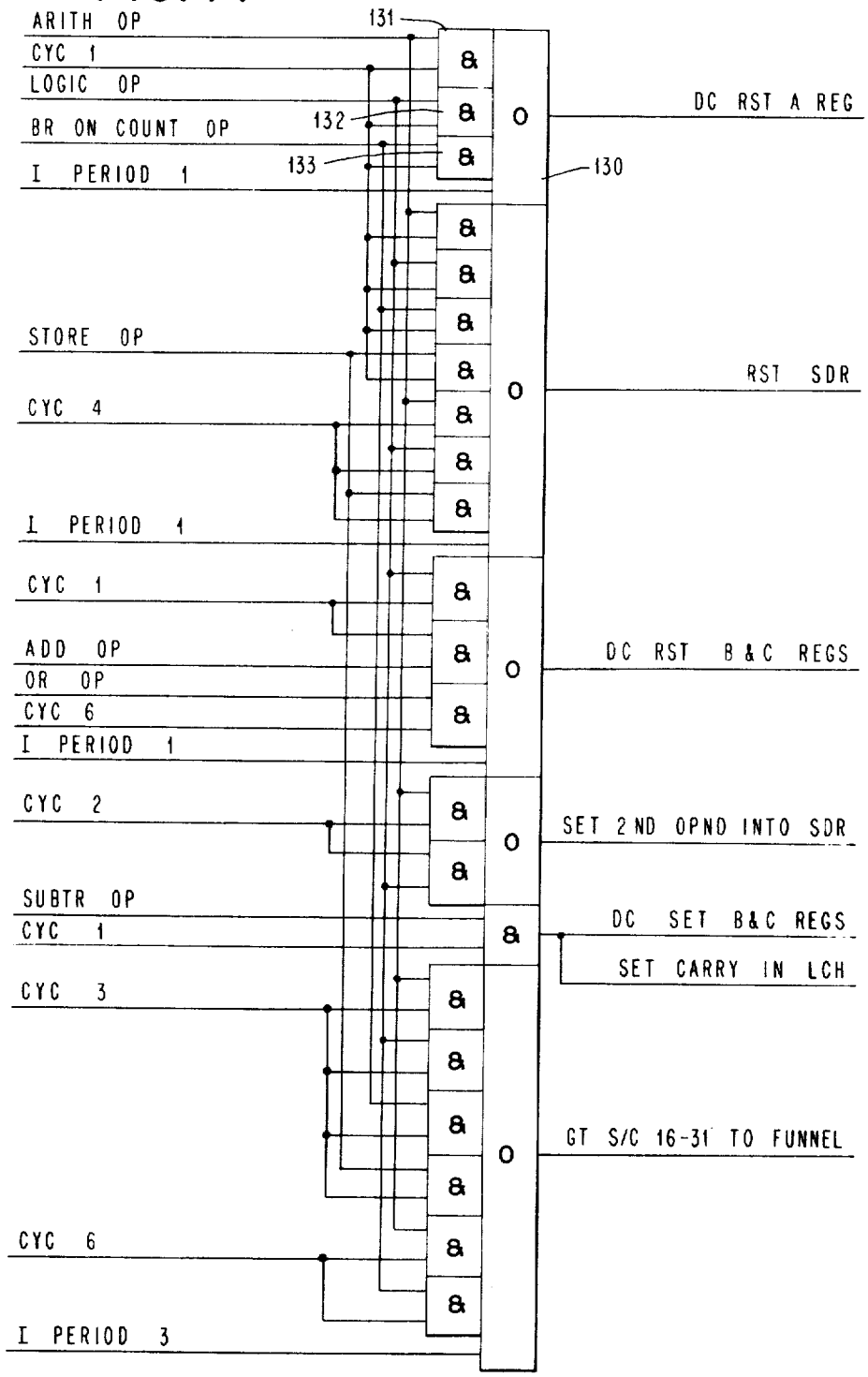
FIGS. 14–16 are schematic block diagrams of logical controls for controlling the movement of data within the embodiment of FIG. 1.
Figure 15:
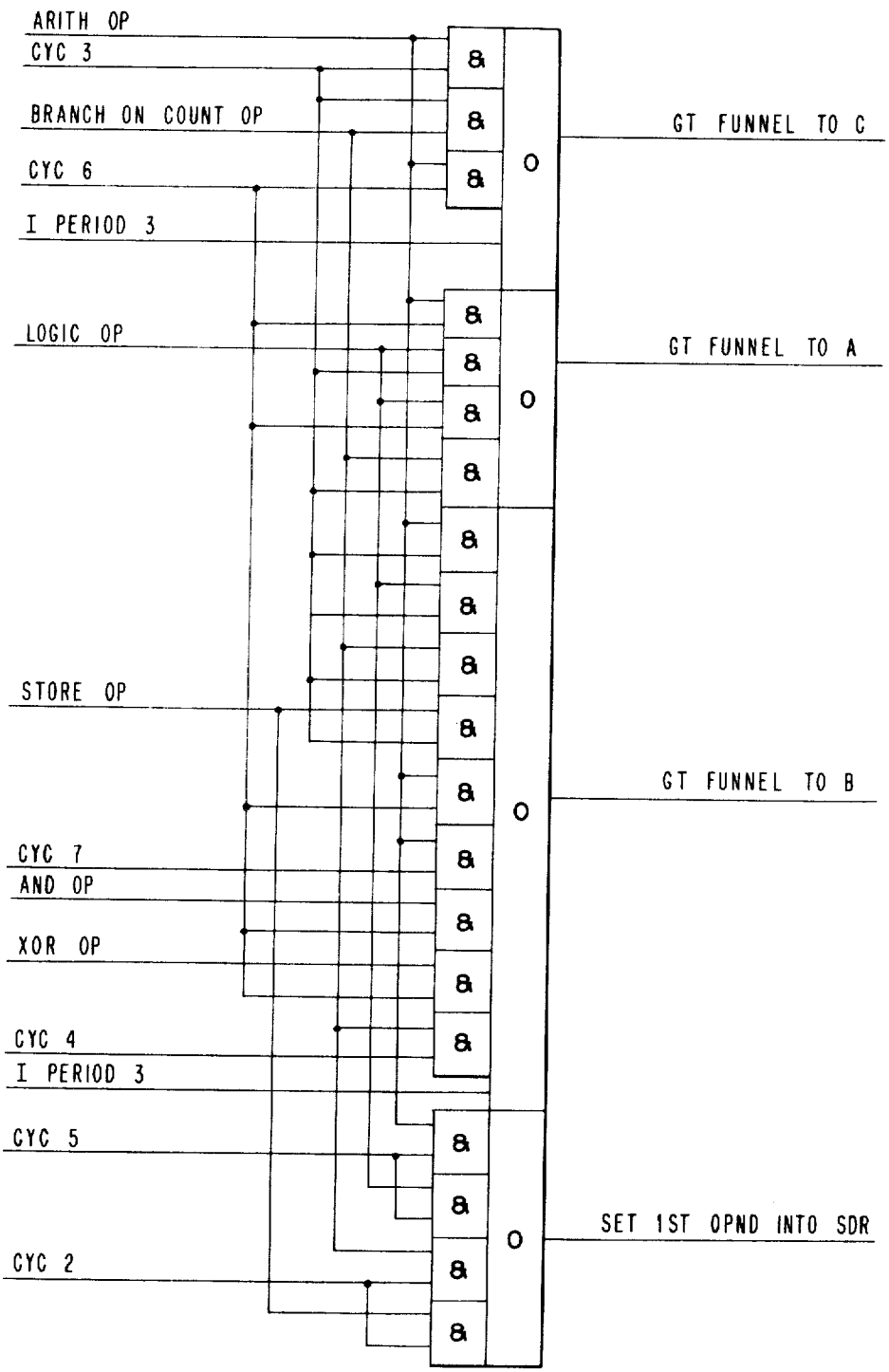
Figure 16:
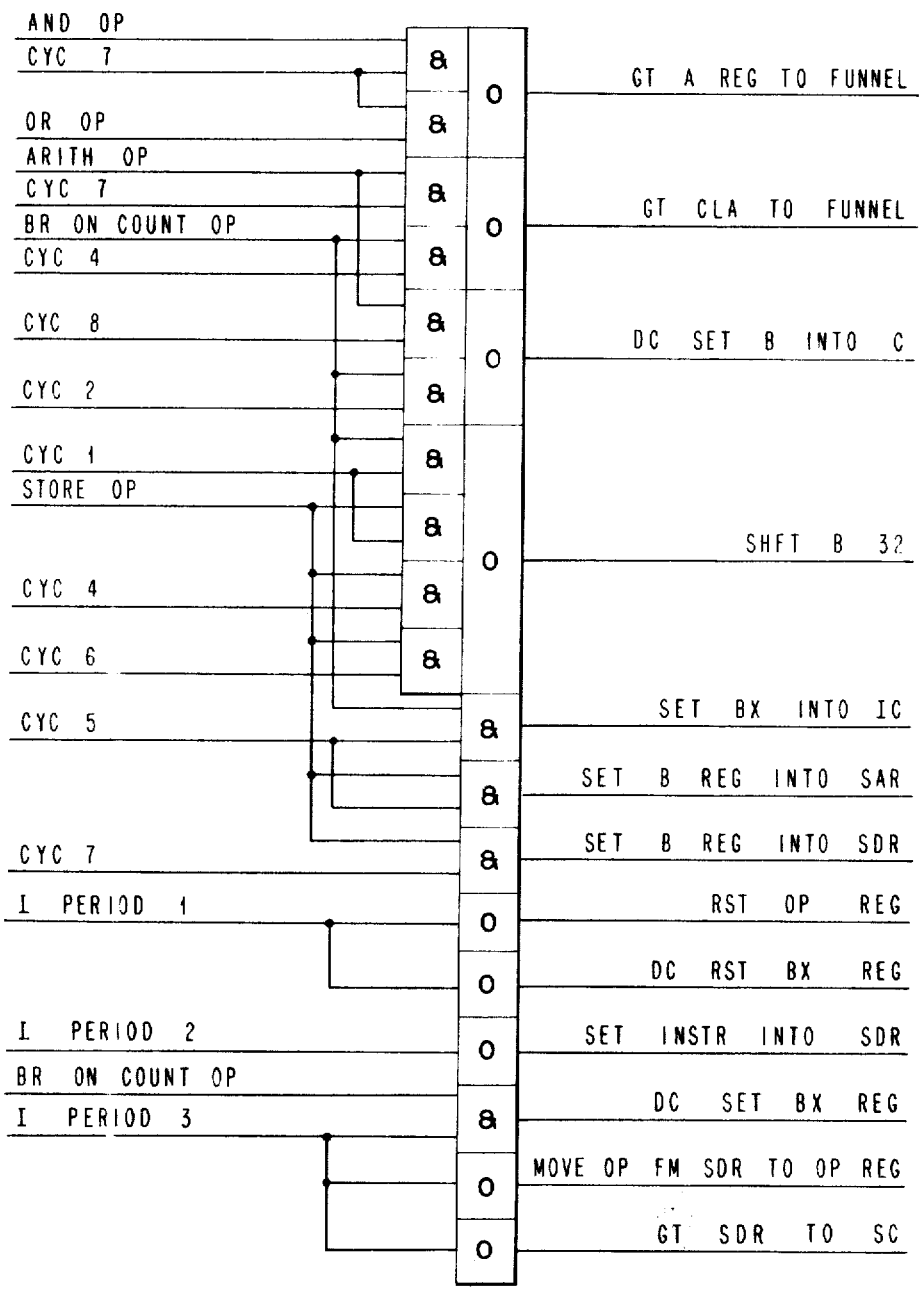

In FIGS. 14–16, control logic for controlling the data flow of FIG. 1 is illustrated. This control logic generates signals on lines which are appropriately identified to perform the functions indicated.

The embodiment of the various aspects of the present invention is disclosed herein in a simplified fashion. Specifically, sufficient general cycles are disclosed so as to illustrate the steps within which the various elements of the data flow in accordance herewith are operated. It is to be noted that no time definition is established for these cycles, and that none is pertinent to the invention herein. For purposes of illustration, therefore, three instruction readout cycles are utilized followed by eight execution cycles. These are referred to as, respectively, I PERIOD 1, I PERIOD 2, I PERIOD 3, and CYC 1 through CYC 8. The cycles themselves are not necessarily identical time periods which would be utilized in an actual system, and in fact some of the functions which are performed simultaneously within a given cycle during either instruction read out or during a particular operation might not necessarily have to be performed simultaneously in an actual operating computing system. However, the relationships of the data flow elements, and the nature of the invention relating thereto are fully illustrated by the exemplary operation of the simple timing which is used herein. It should be noted that in both the copending application of Amdahl et al. and the copending application of MacSorley et al. (which are referred to hereinbefore) are ample illustrations of timing control circuits, operation decoders, control logic generating lines, storage circuits, storage accessing circuits, addressing circuits, program storage word registers and and related controls, and so forth. Since none of these are germane to the present invention, no detailed disclosure or description thereof is contained herein. It is to be further noted that although the present embodiment is considered to be within a system as in the architectural definition set forth in said copending applications and in the aforementioned manual, the invention is not limited to such apparatus, and a brief discussion of the embodiment herein need not follow in detail all of the definitions relating to the system disclosed in said copending application and said manual.

In order to describe the invention herein, an ADD operation and a SUBTRACT operation as well as the three logic connective operations (AND, OR, EXCLUSIVE OR) are briefly described as is a BRANCH ON COUNT operation and a STORE operation. These have been selected merely to show usage of various features of the integrated data flow in accordance with the present invention, and are not limitative nor exhaustive in terms of the manner in which the data flow in accordance herewith could be utilized. Thus at the top of FIG. 14, an OR circuit 130 will generate a signal on a DC RST A REG line, which signal is applied to a line of the same name connected to the diode 65 in FIG. 3 and at an input to the corresponding reset input OR circuit 101 shown in FIG. 4. This signal, when generated, causes the DC resetting of all of the stages of the A register. The OR circuit 130 is operative in a first cycle of an instruction execution (referred to as CYC 1) during an arithmetic operation, a logical operation, or a branch on count operation, due to the respective effects of a plurality of AND circuits 131–133. On the other hand, the OR circuit 130 can cause a signal to be generated on the DC RST A REG line in response to a signal on the I PERIOD 1 line. Thus it can be seen that during the first period instruction read out time, the A register will be reset, and it will also be reset during the first cycle of arithmetic, logic, or branch on count operations. In a similar fashion, each of the signals appearing as output in FIGS. 14–16 is generated in response to one or more combinations of signals indicating the operation being performed, and signals indicating the current cycle of operation. Also, certain of the signals are generated in response to an instruction readout alone without regard to which operation may in fact result from the current instruction readout operation. In order to simplify the description of operation of an exemplary simplified embodiment of the data flow of FIG. 1 in accordance with the present invention, the steps performed in response to any particular operation have been summarized in the following tables.

TABLE 1.—INSTRUCTION READOUT

| I PERIOD 1 | | RST SDR |
| --- | --- | --- |
| | | DC RST A REG |
| | | DC RST B & C REGS |
| | | RST OP DECODE |
| | | DC RST BX REG |
| I PERIOD 2 | | SET INSTR INTO SDR |
| I PERIOD 3 | | MOVE OP FM SDR TO OP REG |
| | | GT SDR (see FIG. 17) |
| | | GT S/C 16-31 TO FUNNEL |
| | | GT S/C 0-15 TO FUNNEL |
| | | GT FUNNEL TO B |
| | | GT FUNNEL TO C |
| | [BR ON COUNT] | DC SET BX |

TABLE 2.—ARITHMETIC OPERATIONS

Figure 17:
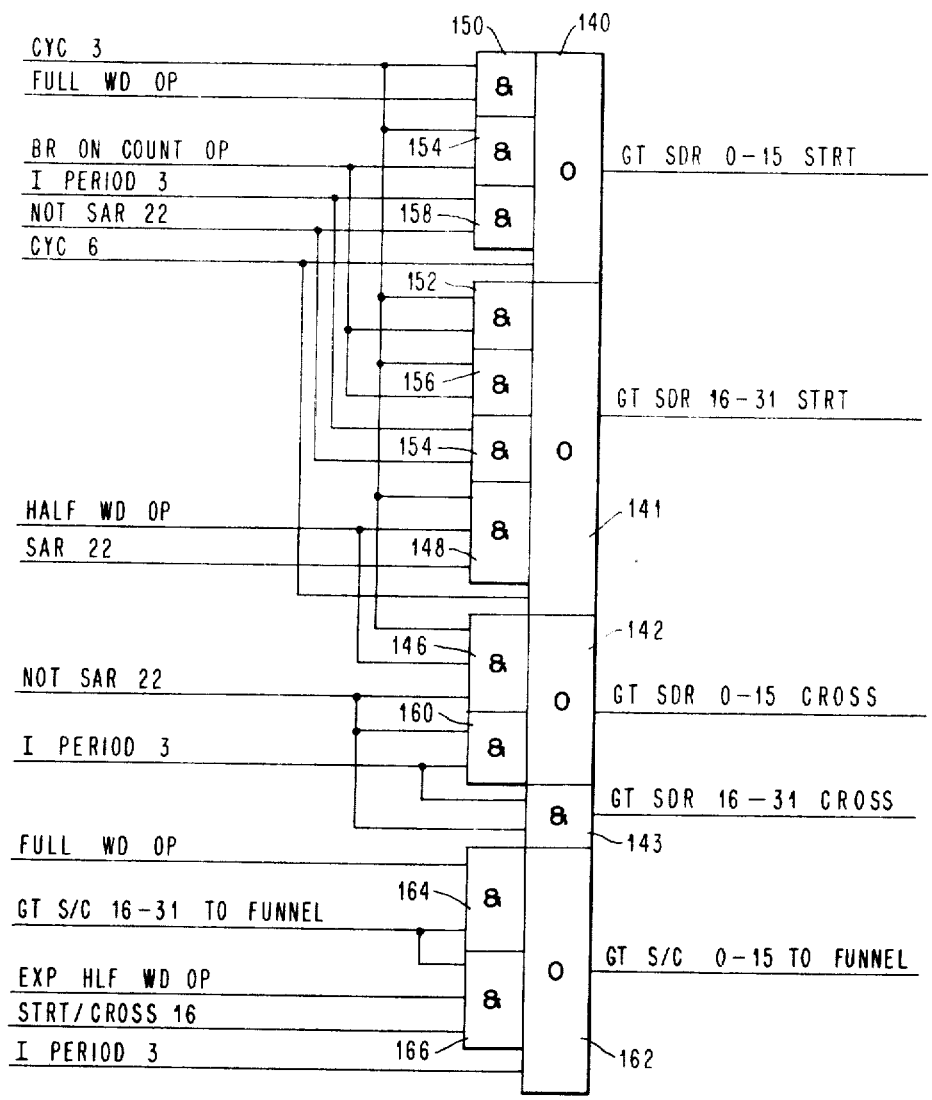
FIG. 17 is a schematic block diagram of the logical controls for the STRAIGHT/CROSS circuit of FIG. 12 and for the FUNNEL of FIG. 13.

| CYC 1 | | RST SDR |
| --- | --- | --- |
| | | DC RESET A REG |
| | [ADD OP] | DC RESET B & C REGS |
| | [SUBTR OP] | DC SET B & C REGS |
| | [SUBTR OP] | SET CARRY IN LCH |
| CYC 2 | | SET 2ND OPERAND INTO SDR |
| CYC 3 | | GT SDR (see FIG. 17) |
| | | GT S/C 16-31 TO FUNNEL |
| | [see FIG. 17] | GT S/C 0-15 TO FUNNEL |
| | | GT FUNNEL TO B |
| | | GT FUNNEL TO C |
| CYC 4 | | RST SDR |
| CYC 5 | | SET 1ST OPND INTO SDR |
| CYC 6 | | GT SDR (see FIG. 17) |
| | | GT S/C 16-31 TO FUNNEL |
| | [see FIG. 17] | GT S/C 0-15 TO FUNNEL |
| | | GT FUNNEL TO B |
| | | GT FUNNEL TO C |
| CYC 7 | | GT FUNNEL TO B |
| | | GT CLA TO FUNNEL |
| CYC 8 | | DC SET B INTO C |

TABLE 3.—LOGICAL OPERATIONS

| CYC 1 | | DC RST A REG |
| --- | --- | --- |
| | | RST SDR |
| | | DC RST B & C REGS |
| CYC 2 | | SET 2ND OPND INTO SDR |
| CYC 3 | | GT SDR (see FIG. 17) |
| | | GT S/C 16-31 TO FUNNEL |
| | [see FIG. 17] | GT S/C 0-15 TO FUNNEL |
| | | GT FUNNEL TO A |
| | | GT FUNNEL TO B |
| CYC 4 | | RST SDR |
| CYC 5 | | SET 1ST OPND INTO SDR |
| CYC 6 | | GTSDR (see FIG. 17) |
| | | GT S/C 0-31 TO FUNNEL |
| | [see FIG. 17] | GT S/C 0-15 TO FUNNEL |
| | | GT FUNNEL TO A |
| | [OR OP[ | DC RST B & C REGS |
| | [ANA OP; XOR OP] | GT FUNNEL TO B |
| CYC 7 | [OR OP; AND OP] | GT A REG TO FUNNEL |

TABLE 4.—BR ON COUNT OP

| CYC 1 | | DC RST A REG<br>RST SDR<br>SHFT B 32 |
|---|---|---|
| CYC 2 | | SET 1ST OPND INTO SDR<br>DC SET B INTO C |
| CYC 3 | | GT SDR (see FIG. 17) |
| | | GT S/C 16–31 TO FUNNEL |
| | [see FIG. 17] | GT S/C 0–15 TO FUNNEL |
| | | GT FUNNEL TO A |
| | | GT FUNNEL TO B |
| | | GT FUNNEL TO C |
| CYC 4 | | GT CLA TO FUNNEL |
| | | GT FUNNEL TO B |
| CYC 5 | | SET BX INTO IC |

TABLE 5.—STORE OP

| CYC 1 | | RST SDR<br>SHFT B 32 |
|---|---|---|
| CYC 2 | | SET 1ST OPND INTO SDR |
| CYC 3 | | GT SDR (see FIG. 17) |
| | | GT S/C 16–31 TO FUNNEL |
| | [see FIG. 17] | GT S/C 0–15 TO FUNNEL |
| | | GT FUNNEL TO B |
| CYC 4 | | RST SDR<br>SHFT B 32 |
| CYC 5 | | SET B REG INTO SAR |
| CYC 6 | | GT SDR (see FIG. 17)<br>SHFT B 32 |
| CYC 7 | | SET B REG INTO SDR |

Since the operation of the various circuits of FIGS. 14–16 are identical with the circuitry 130–133 at the top of FIG. 14 described hereinbefore, further description is believed to be unwarranted.

Referring now to FIG. 17, control over the gating of bits 0–15 and bits 16–31 of the storage data register, either straight or cross, in any combination, is controlled by three OR circuits 140–142 and an AND circuit 143. The operation of these circuits is address dependent whenever half-word logic is being performed, or whenever portions of an instruction are being passed from SDR through to the FUNNEL. However, when full-word logic is being performed, the architectural definition of a data processing system set forth in the aforementioned Manual specifies that full-word operations are to be performed with words found at addresses in storage which are on integral word boundaries. In other words, the data will come from storage 20 into the SDR 22 properly aligned for data processing by the circuitry of FIG. 1. In the case of half-word operations, only sixteen bits (0–15 or 16–31) will be utilized. Which of the sets of bits is to be used depends on bit 22 of the address, which will specify either an odd or even half word of the storage word which is presented to the SDR by the storage 20. If an even address is utilized, this means that the high order half-word (0–15) is to be used, and so bits 0–15 will be gated cross to the FUNNEL. This is accomplished by the OR circuit 142 in response to an AND circuit 146 due to signals present on the following lines: CYC 3, HALF WD OP, and NOT SAR 22. On the other hand, if half-word logic is being performed and the address of the half-word is odd, then the OR circuit 141 will respond to an AND circuit 148 due to signals on the following lines: CYC 3, HALF WD OP, and SAR 22. This will cause a signal to be present on the GT SDR 16–31 STRT line which will cause bits 16 through 31 to be passed straight through to bits 16–31 of the FUNNEL. In the case of full-word operations, the OR circuit 140 and the OR circuit 141 will respond respectively to the AND circuit 150 and an AND circuit 152 so as to pass bits 0–15 and bits 16–31 straight, to corresponding bits of the FUNNEL. A similar result is achieved when performing the branch on count instruction in which the entire 32-bit data field of the SDR is to be passed straight through to the FUNNEL. This is achieved by AND circuits 154 and 156.

During instruction readout, thirty-two bits are to be utilized, but the thirty-two bits may or may not be properly oriented, depending upon the address of the particular instruction which is being read out. Unlike full-word operations, addresses are not architecturally defined for instructions to be upon word boundaries, but are rather defined to be upon half-word boundaries. Thus a particular instruction may extend through the high order half-word of a first storage word and the low order word of a subsequent storage word, both of which are presented to the SDR by the storage at the same time. However, these half words are transposed in position within the SDR, and must be again transposed by the STRAIGHT/CROSS mechanism before application to the FUNNEL. Therefore, each of the OR circuits 140–142 is responsive to a related AND circuit 158–160 which corresponds to the AND circuit 143 so as to gate both groups of data in the proper relationship to the FUNNEL.

The control of the gating of the STRAIGHT/CROSS mechanism bits 0–15 to the FUNNEL is shown at the bottom of FIG. 17. As described with respect to the upper portion of FIG. 17, any time that the single half-word (either bits 0–15 or bits 16–31) is to be transferred from the SDR through the STRAIGHT/CROSS to the FUNNEL, those bits will always appear in bits 16–31 at the output of the STRAIGHT/CROSS mechanism. Therefore, as shown at the bottom of FIG. 14, any time that data is to be transferred from the SDR to the FUNNEL, a signal is generated on the GT S/C 16–31 TO FUNNEL line. If, in addition, bits 0–15 are also to be transferred to the FUNNEL, then the circuitry at the bottom of FIG. 17 will cause this to happen. The gating signal is generated by an OR circuit 162 in response to I PERIOD 3 or in response to either one of two AND circuits 164, 166. Both of these AND circuits are responsive to the signal on the GT S/C 16–31 TO FUNNEL line. The AND circuit 164 will operate during a full-word operation, and the AND circuit 166 will operate in the case where a half-word operation is involved, but the half-word is to be expanded to a full-word by propagating the sign bit thereof. This is in accordance with the architectural definition of the data processing system set forth in said Manual. The sign bit of the half-word operand is the highest ordered bit of the half-word, which appears as bit 16 as it leaves the STRAIGHT/CROSS mechanism. If this sign bit (bit 16) is a one, then bits 0–15 are to be set to ones also; if bit 16 is a zero, then bits 0–15 are to be set to zero also. In order to establish a field of ones, the STRAIGHT/CROSS mechanism shown in FIG. 12 is utilized in its quiescent state with respected to bits 0–15. Thus, regardless of whether bits 0–15 are gated cross, or bits 16–31 are gated straight, the establishment of signals for passing the half-word operand through the STRAIGHT/CROSS mechanism to the FUNNEL will be under the control of the AND circuits 114, 116, the OR circuits 115, and the inverters 117. Thus the inverters 113 relating to bits 0–15 of the STRAIGHT/CROSS mechanism will all have outputs representing ONES due to the fact that there is no signal present on either the GT SDR 0–15 STRT, or GT SDR 16–31 CROSS lines. Thus the ones are available at the outputs of the inverters 113. The question then becomes: Is the sign bit itself a one or is the sign bit a zero? If the sign bit is a one, then the AND circuit 166 will permit gating bits 0–15 of the STRAIGHT/CROSS mechanism through to the FUNNEL. On the other hand, if bit 16 is a zero, then no signal will be generated by the OR circuit 162 so that bits 0–15 will not be gated to the FUNNEL and the FUNNEL will be established as all zeros in bits 0–15.

DESCRIPTION OF INSTRUCTION READOUT

Insofar as the data herein is concerned, instruction readout may comprise three basic cycles which are set forth in Table 1. In the first of the instruction readout cycles (I PERIOD 1) the storage data register, the A, B, BX, and C registers, and the OP decode and other control circuits, are all reset and made ready. During the second instruction period, an instruction which has been addressed in storage is read into the storage data register.

During the third instruction period, the operation portion of instruction is moved from the storage data register to the operation register so the operation may be decoded, and the operand address portion of the instruction is moved from the storage data register through the STRAIGHT/CROSS and FUNNEL to registers B and C. If a branch on count instruction is involved, the BX register is set to all ones by the DC set. Thus, at the start of any of the operations about to be described, an address relating to the instruction is set in the B and C registers.

ARITHMETIC OPERATIONS

Referring to Table 2 and to the schematic block diagram of the apparatus of FIG. 1, the first cycle of an arithmetic operation causes the resetting of the data storage register and the fetching of a proper operand. The A register and the storage data register are both reset. When an add operation is involved, the B and C registers are reset, but if a subtract operation is involved, the B and C registers are both set to all ones. This setting to all ones permits having the one's complement of one of the operands automatically established in the B and C registers when this operand is gated into the B and C registers. In this connection, the first operand to be placed in B and C is, by definition, called the second operand in the architectural definition of a system set forth in said copending applications and in said Manual. This means that it relates to the second operand address, not that it is necessarily the second operand to be operated upon in time. Thus in the present embodiment, in cycle two, the second operand is moved from storage into the storage data register. Then in cycle three the storage data register is passed through the STRAIGHT/CROSS mechanism to the FUNNEL, and through the FUNNEL to the B and C registers. It is to be noted that the content of the FUNNEL is presented to the AC binary trigger inputs (the capacitors 66, 71, 76) of each of the stages of the A, B, and C registers. The conditioning line for these registers will be established during the third period, so that as soon as the STRAIGHT/CROSS mechanism is gated, a shift will appear at the input of these capacitors thereby causing the stages of the B and C registers to reverse themselves, and the A register stages to be set. Since the trigger stages of the B and C registers will reverse themselves in response to any bit of data which appears through the FUNNEL, this amounts to taking the EXCLUSIVE OR of whatever was previously in the B and C registers. In the case of an ADD operation, the B and C registers were reset prior to gating the data of the second operand through the FUNNEL; therefore, the data will appear in the B and C registers as it appeared in the SDR. On the other hand, during a subtract operation, the B and C registers are previously set to all ones (in CYC 1) so that when the second operand data is dated through the STRAIGHT/CROSS mechanism and the FUNNEL into the B and C registers, every bit of the data will be reversed so that the one's complement of the data will be set into the B and C registers. This provides the second operand in one's complement form so that it may be EXCLUSIVE ORed with the first operand in true form thereby providing a function which is the sum module two subtraction of the second operand from the first operand. Stated alternatively, each bit of the first operand will be EXCLUSIVE ORed with the complement of the bit of the second operand thereby providing half sums in a complement add operation. During the fourth cycle of an arithmetic operation, the storage data register is reset thereby eliminating the second operand therefrom and preparing it to receive the first operand from storage. In cycle 5, the first operand is gated from storage into the storage data register by the timing and addressing circuits 36 in a well-known fashion. During the sixth cycle, the storage data register is gated to the STRAIGHT/CROSS mechanism, and the STRAIGHT/CROSS mechanism is gated to the FUNNEL, which passes the data to the B and C registers. Since trigger inputs to the B and C registers are utilized, any bit in the first operand will cause a reversing of a bit in the second operand, thus making the logical EXCLUSIVE OR of the two operands, which is also equivalent to making the half sums of these two operands. The A and C registers are directly connected to a carry look ahead mechanism 32 which is shown in FIG. 18.

In FIG. 18, the carries into the respective bits are generated in a novel manner. Only the half sum of the two operands and one of the raw operands are used to generate carries. This has the advantage that as successive iterations are performed (accumulation) the original format of one operand need not be maintained, nor need special "generate" and "propagate" functions be provided. Also, complementing need not be provided directly to either input for subtractions (as in the BRANCH ON COUNT operation).

The CLA outputs of FIG. 18 represent "carries into bits" for the like numbered bits of the half sum. These carries will provide a final sum when EXCLUSIVE ORed with like numbered bits of the half sum. The CLA of FIG. 18 therefore provides the same function as the bit carry circuit shown in FIGS. 169–173 of said copending application of MacSorley et al.

In FIG. 18, if there is a CARRY IN (a "hot 1"), then this is a carry into bit 31, the lowest ordered bit of the operand. This carry may propagate into bit 30, if there is a ONE in bit 30 of the half sum in the C register, at the input to an AND circuit 200. If bit 30 of the half sum is a ZERO (because both operands applied to the register had ONES in this position), then an AND circuit 201 will operate; this is so because the lack of a half sum (NOT C REG 31) together with the presence of one operand (A REG 31) inherently means that both operands are present. With bit 31 of both operands present, there will be a carry into bit 30 with or without a carry into bit 31. Thus, the AND circuit 201 need not monitor the CARRY IN signal.

Thus, the OR circuit 202 can generate a carry into bit 30 in response to a carry into the carry generator due to the AND circuit 200 or in response to there being a bit in position 31 of each operand due to the AND circuit 201.

An output from the OR circuit 202 is applied to an AND circuit 203 which corresponds to the AND circuit 200; similarly an AND circuit 204 corresponds to the AND circuit 201. An OR circuit 205 performs the same function as the OR circuit 202. Thus a carry into bit 29 may result from a carry into bit 30 together with a half sum in bit position 30 (AND circuit 203) or because of there being ones in position 30 of both the operands (AND circuit 204). The output of the OR circuit 205 is applied to an AND circuit 206 (which corresponds to the AND circuits 200, 203) so as to operate an OR circuit 208 (which corresponds to the OR circuit 202, 205). Also feeding the OR circuit 208 is an AND circuit 207 (which corresponds to the AND circuits 201, 204). The result of the OR circuits 202, 205, and 208 is to have a ripple carry between bits 31 and 28. However, an OR circuit 211 is responsive to a plurality of AND circuits 200a, 201a, 204a, 207a, 210 so as to generate a carry into bit 27 without the need for rippling carries from the low order bits (31–28). The AND circuit 200a monitors a carry into the carry generator together with bits in all subsequent ordered positions of the half sum (see C REG) to determine that a carry would propagate all the way to bit 27. Similarly the AND circuit 201a determines when a carry generated in bit 31 will propagate to bit 27. The AND circuit 204a determines when a carry generated in bit 30 will propagate to bit 27, AND circuit 207a determines when a carry generated in bit 29 will propagate to bit 27, and the AND circuit 210 corresponds to AND circuit 201, 204, and 207 to determine that a carry is generated in the next lower ordered bit (bit 28). Bits 26–1, and bit 0 (which generates a carry out of the carry look ahead adder at the highest order position thereof) have been eliminated from the drawing of FIG. 18 for simplicity. However the remainder of the carry look ahead would comprise eight sets of the hardware shown in FIG. 18 connected to correspondingly different bit positions, the carry out of the OR circuit 211 (which is a carry into bit 27) being applied as the carry into the next higher ordered four bit group, and so forth. Since the FUNNEL is connected to binary inputs of the B and C registers the first operand (gated into the B and C registers during the sixth cycle) is EXCLUSIVE ORed with the second operand (which is gated into the B and C registers in the third cycle).

In cycle seven, by gating the carry look ahead through the FUNNEL to the B register, the carries into bits which relate to the carry propagation function of the carry look ahead mechanism 32 are EXCLUSIVE ORed with the half sums which have been formed in the B register as a result of forming the EXCLUSIVE OR of the two operands. This provides a complete sum in the B register.

It is to be noted that the only difference between an add operation and a substract operation is that when substraction is being performed, the B and C registers are initially set all ONES by a signal on the DC SET B & C REGS line rather than being reset to all zeros by the DC RESET B & C REGS line. Additionally, on a subtract operation, the carry in latch is set so that the two's complement of the second operand is formed as a result of being EXCLUSIVE ORed with all ones.

LOGICAL OPERATIONS

Basically speaking, the logical connective functions of two operands are performed in the A and B registers by forming the OR in the A register and the EXCLUSIVE OR in the B register. If a logical AND is to be provided, the OR formed in the A register is then EXCLUSIVE ORed with the EXCLUSIVE OR result which is previously formed in the B register; this provides the logical AND of the two operands. Therefore, it is only in the final two cycles that there is a difference between the AND, the OR, and the EXCLUSIVE OR operations.

In the first cycle, the A, B, and C registers and the SDR are all reset. In the second cycle the second operand is gated into the SDR from storage. During a third cycle the SDR is gated through the FUNNEL to the A and B registers. In a fourth cycle the SDR is reset so as to make it ready to receive the first operand which is set therein during the fifth cycle. In cycle six the SDR is again gated through the FUNNEL and to the A REG. Thus, at the end of cycle six, if an OR operation is involved, the OR of the operands has already been formed in the A register. During the cycle six of an OR operation, the B and C registers are reset; this is to prepare the B register to receive the OR through the FUNNEL from the A register merely to place the contents of the A register in the position where it may be transmitted back to the storage data register so the result may be stored or put in the general purpose registers. On the other hand, during the AND operation and the EXCLUSIVE OR operation, the SDR is gated through the FUNNEL to the B register as well as the A register during the sixth cycle.

Note that the example herein takes the result to the B register only, and that additional control cycles, well-known in the art, are to be provided to return the result from the B register either to a general purpose register or to the storage data register for storage or for transfer elsewhere in the system, in accordanace with any design being implemented herewith.

In the seventh cycle of a logical operation, if an OR operation is involved then the OR result which is in the A register is transferred to the B register since the B register is a register for containing the final result in the present embodiment. If an AND operation is involved the A register is gated through the FUNNEL to the B register so that the OR of the operands will be EXCLUSIVE ORed within the B register with the result therein (which is the EXCLUSIVE OR of the operands) EXCLUSIVE ORing the OR with the EXCLUSIVE OR results in the logical AND. In either case, the final result is then in the B register. Note that for the EXCLUSIVE OR operation, the result is formed in the B register as soon as the SDR is gated through the STRAIGHT/CROSS and the FUNNEL into the B register during the sixth cycle.

BRANCH ON COUNT OPERATION

In the Branch on Count operation (Table 4), the branch address (or branch-to, or subject address) has been formed in the B register during the instruction readout peroids. Also, the BX register is set to all ones by a signal on the DC SET BX line during I PERIOD 3. In the first cycle of the Branch on Count operation (Table 4) the A register and the SDR are reset, and the data content of the B register is exchanged with the content of the BX register in response to a signal on the SHFT B 32 line which causes a 32 bit shifting between the B and BX registers. This places the branch address in the BX register and all ones in the B register. The purpose of having the all ones in the B register is to assist in subtracting one from the count which is involved in determining whether or not the branch is to take place. This is described in detail in said Manual. The decrementing of the count function is therefore achieved by adding the two's complement of one to the count in the manner similar to an ADD operation. Thus, the B register is prepared in the first cycle with the two's complement of binary 1, which equals the one's complement of binary zero, and comprises a field of all ones.

In cycle two, the first operand is set into the storage data register from storage. This operand is the count factor which is to be decremented to determine when the branch is to take place. The all ones field is moved into C, from B. In the third cycle the storage data register is gated through the FUNNEL to the A, B, and C registers, just as in the arithmetic operation. Since the two's complement of binary one is set in the B and C registers, the binary trigger action of the FUNNEL input to the B and C registers causes the EXCLUSIVE OR (the half sum) of the count with the complement of binary one thereby forming a half sum of the decremented count value. In the fourth cycle the carry look ahead, which follows the contents of the A and C registers at all times, is gated through the FUNNEL to the B register so as to EXCLUSIVE OR the carry look ahead functions with the half sum which is in the B register, thus providing a final sum. This provides a decremented count which can be examined to determine whether or not the branch is to take place. If the branch is to take place there is a direct data path over which the contents of the BX register may be transferred to the IC portion (the instruction counter) of the PSW register. This will therefore put the branch address into the instruction counter to control further operation of the machine in the event that the branch is successful as determined by the contents of the B register following the fourth cycle. In the sixth cycle, an automatic gating of the SDR through the STRAIGHT/CROSS mechanism takes place; this is not involved with the Branch on Count operation but simplifies the controls by permitting this redundant gating to take place.

STORE OPERATION

The store operation, which is illustrated in Table 5, and the definition of which appears in the aforementioned Manual, stores the contents of a general register identified by the first operand address at a storage location identified by the second operand address. The second operand address is specified by the instruction, and during I PERIOD 3, this address is transferred through the STRAIGHT/CROSS and FUNNEL to the B and C registers. In I PERIOD 1, the BX register is reset to all zeros. Thus at the start of the execution of the instruction, the address into which the data is to be stored in storage is in the B register and the BX register is set to all zeros. The general register may be one of the general purpose registers 48 shown at the bottom of FIG. 1, or, in a different embodiment of a similar nature, may be within a CPU working register portion of the main storage 20. The description about to be given assumes that the data which is to be stored will pass either from storage or from the general purpose register 48 into the SDR; for the purposes of the invention herein, it suffices that the data to be stored comes from the SDR, following the address which determines where the data is to be stored.

In cycle one of the store operation, the SDR is reset, and the contents of the B and BX registers are transposed in response to a signal to the SHFT B 32 line. This places the address (defining where the data is to be stored) in the B Xregister, so that it will be available at a later time, and sets the B register to all zeros since the BX register has previously been reset to zeros during I PERIOD 1. During the second cycle, the first operand (the actual data to be stored) is placed in the SDR from the general registers (either located in main storage or located in hardware general registers 48). During the third cycle, the SDR is gated through the FUNNEL to the B register. In a fourth cycle, the SDR is again reset so as to be available to receive the data which is to be placed in storage; note that the SDR performs both storage input and storage output buffering functions. Also in the fourth cycle, the contents of the B and BX registers are again exchanged so as to place the data which has been read out of the general registers in the B register, and so as to return the address which is controlling the operation to the B register. Then the B register is gated to the storage address register. In the sixth cycle, the storage data register is automatically gated through the STRAIGHT/CROSS to the FUNNEL, although this does no work during the store operation, it simplifies the logic to allow it to take place and it does not hurt anything. Also in the sixth cycle, the contents of the B and BX register are transferred so as to place the data which is in the BX register into the B register (since the address has left the B register and is now in SAR). In cycle seven the data in the B register is transferred to the storage data register so that the operation can be complete by storing the data which is in the SDR at the end of cycle seven in the storage device 20.

SUMMARY OF DATA FLOW FEATURES

Direct current responsive latches which comprise AND circuits and OR circuits connected in a feed back relationship, as described in Section 5 of said copending application of MacSorley et al., are inherently relatively slow devices. To provide latches which operate at high speed (such as in said MacSorley et al. application), expensive components are required. Also, the use of direct current latches, in apparatus in which exchanging of data between a pair or registers is to take place, requires that there be buffer registers between each of the registers. Thus, a transfer of data between the B register and the BX register herein, would require (if DC latches were used) an additional register between the output of the B register and the input of the BX register, and a second additional register between the output of the BX register and the input of the B register. This is due to the fact that the DC latches have a characteristic wherein the output changes almost as soon as there is a tendency to change the input, so that race conditions result if buffering registers are not provided. The AC trigger on the other hand has a delay characteristic which permits direct interchange from one to another and from the other back to the first, without the need of buffer registers. This is due to the fact that the time delay of the capacitors input of the device permits using the output of one device to condition the second device and then supplying a timing signal to immediately effect the transfer from each device into the other before the device has had an opportunity to change state. By suitable choice of capacitive and resistive elements at the inputs to these triggers, race conditions can be avoided.

On the other hand, the present invention includes the usage of these capacitor inputs in an inverse manner so as to provide high speed (rather than slow speed) operation. In this case, the gating signal is not applied to the capacitor, but rather is applied to the resistive input; then the data is gated directly to the capacitive input through gating means which is normally required for other purposes (such as the STRAIGHT/CROSS mechanism in FIG. 1). This means that as soon as data is available on the trunk line between the gating means and the trigger, the trigger will respond to the data. This feature is utilized in gating the FUNNEL into the A, B, and C registers. The C register in the present case has its feedback conditioning input terminals applied to the outputs of the B register rather than to its own outputs, the C register is stressed toward the setting of the B register prior to actual setting of the contents of the B register into the C register. This means that once stable data in the B register is assured, and the data is set into the C register, binary trigger action of the C register is available without waiting for the outputs of the C register to become stable. It is to be noted that in the particular case where this is accomplished (Branch on Count operation), it is utilized because the setting of the B register to all ones so as to effect a complement adding of a unitary value to a count function is achieved by a fast change of data from the BX register. In order to avoid another connection to the C register, or a CX register to back up the C register, the C register is set to all ones by transferring the content of the B register into the C register; connection of the C register trigger feedback paths to the output of the B register, the C register is stable sooner, so the SDR can be gated into B and C without waiting for C to stabilize.

The high speed resetting and setting of registers by transferring an all ones or all zeros condition thereto avoids the necessity to wait until a DC set or reset control line has been deenergized allowing conditions to become stabilized with full output potentials. Thus, in the transfer of all ones or all zeros (such as in Branch on Count operations) from the BX register to the B register, it is thereafter possible to more quickly form a stable half sum in the B register since stability is achieved immediately upon the transfer of the data from BX into B.

No operation has been described illustrating the uses of the A and AX registers, which relate to floating point operations not described herein. However, it is clear from the descriptions of the other registers and typical operations that the A and AX registers are capable of performing reciprocal functions for one another such that the A register may perform several different functions in series, while retaining data from one step for use in a further step by transferring it to the AX register, and calling for data from the AX register in a subsequent cycle by effecting another transfer. Notice that the AX register feeds the A register by applying the data directly to the resistive inputs of the A register, while the command to transfer data between the two registers is applied to the capacitive input; since the other possible resistor will be tied to a negative potential, and therefore preparing each of the triggers to be set, the transfer between the A and AX registers is very fast.

Subtraction is very simple in accordance with the present invention due to the fact that the complement of one operand may be formed in either one of two ways. During a subtract operation, the B and C registers are preset to all ONES by a DC set signal so that the initial placing of an operand (the second operand) into the B and C registers will cause the one's complement of that operand to be formed therein since the EXCLUSIVE OR function takes place automatically. On the other hand, all ONES are applied to the B and C registers during half word operations wherein the half word is to be expanded to full word by means of propagation of the sign due to the inverted logic function of the STRAIGHT/CROSS mechanism which automatically provides all ones at any time that no particular gate selection is being made. It is therefore obvious that the STRAIGHT/CROSS mechanism can provide all ones for the purposes of complementing a value in the B and C register (as in the subtract operation). Thus, a variety of operations similar to subtract can be performed by providing all ones to complement an operand already in the B and C registers simply by gating the STRAIGHT/CROSS mechanism through the FUNNEL to the B and C registers with no gating signals provided to the STRAIGHT/CROSS mechanism. In other words, by raising signals that gate STRAIGHT/CROSS to the FUNNEL and signals that gate B and C with the FUNNEL, all ONES will be supplied to the B and C register. In a similar fashion, it is possible to provide any fixed operand (such as the increment used for timer updating as described in said copending MacSorley et al. and Amdahl et al. applications) by forcing certain of the bits at the STRAIGHT/CROSS mechanism to be ZEROS rather than the quiescent ONES which normally result. The hardware used may be a "dot OR," or it may be additional AND circuits which are blocked in the case of a timer update or similar fixed-operand-type operation.

The logical functions (AND, OR, and EXCLUSIVE OR) are performed merely by using the inherent nature of the A, B, and C registers so that the A register automatically provides the OR function, the B register provides the EXCLUSIVE OR function and the AND function can be provided by combining the OR and the EXCLUSIVE OR. This has the additional advantage that in the cycle following the generation of the OR and the EXCLUSIVE OR, the B register may be reset to all zeros; then if the A register is passed back through the FUNNEL to the B register, the B register result will contain the OR of the operand; on the other hand, if the EXCLUSIVE OR is required, the B register is not reset and the A register is not passed to the B register. But if the AND is required, then the A register is passed through the FUNNEL to the B register without previously setting the B register so as to generate the logical AND. Thus, it is very simple to provide a logical result in the B register which may be any one of three major logical connectives with the data flow of the present invention.

For simplicity, multiplication and divide operations have not been described. However, it should be apparent to those skilled in the art that the shifting and arithmetic capabilities of this data flow are ideally suited for simplified multiplication and division. For instance, the shifting capability of the B and BX registers makes it possible to take large sums generated in the B register (as in an Add operation) and very simply transfer them to other positions of the B and BX registers during the iterations of multiplication and division. Thus, additional data flow, and the requisite time for propagation of data through data flow trunk lines and through hardware shifting apparatus is avoided.

Although the invention has been shown and described with respect to a preferred embodiment thereof, it should be understood by those skilled in the art that various changes and omissions in the form and detail thereof may be made therein without departing from the spirit and scope of the invention, which is to be limited only as set forth in the following claims.

What is claimed is:

1. For a data procesing system having a memory for storing instructions and data, and an instruction section for receiving and decoding instructions and providing signals for controlling the processing to be performed, the combination comprising:

a data flow path adapted to receive data from memory and provide digital output signals indicative thereof, said path including a plurality of parallel data paths for the parallel transmission of individual bits of data;

means for processing said data, said means comprising a register having a plurality of stages each including a bistable trigger means switchable between a set state representing a one bit and a reset state representing a zero bit;

each of said trigger means having:
two output lines providing complemented signals representing a bit,
a DC reset input means adapted to receive a DC signal for resetting said trigger,
an AC reset input means adapted to receive a triggering pulse for resetting said trigger,
and a set input means adapted to receive a triggering pulse for setting said trigger;

each of said stages including:
a pair of bipolar gates for supplying triggering pulses to said set input means and to said AC reset input means,
each of said bipolar gates including a DC input means for receiving a DC gating signal and an AC input means connected to one of the outputs of said data flow path for receiving a data bit therefrom whereby said associated trigger means is set when a gating signal is applied to said DC input means and a signal appears at the corresponding output of said data flow path,
and a pair of binary gates for supplying triggering pulses to said AC reset input means and to said set input means,
each of said binary gates including a capacitive input means for receiving an AC signal for inverting said associated trigger means, and a resistive input means connected to one of said output lines of said associated trigger means for switching said trigger means to an opposite state in response to said invert signal;

said register further including:
a DC reset input line connected in common to all of said DC reset input means for supplying DC reset signals thereto,
an invert input line connected to said capacitive input means of said binary gates for supplying invert signals thereto,
and a gating input line connected to said DC input means of said bipolar gates for supplying gating signals thereto to gate data into said register;

and control means connected to said register input lines for supplying signals selectively thereto for resetting said register, setting said register in accordance with the data received from the data flow path, inverting the respective bits of said register, and setting a second data word appearing at the output of said data flow path into said register so as to OR said second word in said register with a first data word already set therein.

2. The combination of claim 1 including:
a second register having a plurality of stages corresponding to the stages of said first-mentioned register, said second register having input means connected to the output lines of said first register for receiving data therefrom, said second register having output lines, and a control line for setting said second register in accordance with the contents of said first register, in response to a signal supplied to said control line;

said first register having additional input means connected to the output lines of said second register for setting said first register in accordance with the contents of the second register, and a control line for supplying signals to set said first register in accordance with the contents of said second register, whereby the contents of the two registers are swapped by control signals applied to said control lines.

3. For a data processing system having a memory for storing instructions and data, and an instruction section for receiving and decoding instructions and providing signals for controlling the processing to be performed, the combination comprising:

a data flow path adapted to receive data from memory and provide digital output signals indicative thereof, said path including a plurality of parallel data paths for the parallel transmission of individual bits of data;

means for processing said data, said means comprising a register having a plurality of stages each including a bistable trigger means switchable between a set state representing a one bit and a reset state representing a zero bit;

each of said trigger means having:
- two output lines providing complemented signals representing a bit,
- a DC set input means and DC reset input means for setting and resetting said trigger means in response to DC signals applied respectively thereto,
- an AC reset input means for resetting said trigger means in response to a triggering pulse supplied thereto,
- and an AC set input means for setting said trigger means in response to a triggering pulse supplied thereto;

each of said stages including:
a first pair of bipolar gates for shifting data between predetermined stages of said register, each of said bipolar gates including a resistive input means connected to the output line of the trigger means of said predetermined stage, and a capacitive input means for receiving an AC shift signal to produce a triggering pulse for setting said stage in accordance with data received from said predetermined stage, and a pair of binary gates connected to said AC set and reset input means for supplying triggering pulses thereto, each of said binary gates including a first resistive input means for receiving a DC gating signal, a second resistive input means connected to one of the output lines so as to switch said trigger means to the opposite state, and a capacitive input means connected to receive one of said digital output signals from said data flow path for setting said register in accordance therewith;

said register further including:
DC set and reset input lines connected to said DC set and reset input means of said trigger means for setting said register to all zeros and to all ones in accordance with DC reset and set signals applied to said respective input lines, a shift input line connected to said capacitive input means of said bipolar gates for supplying AC shift signals thereto so as to shift the contents of said register between said stages, and a gating input line connected to said first resistive input means of said binary gates for conditioning said gates to set said register upon the receipt of data from said data flow path;

and control means connected to said register input lines for supplying signals selectively thereto for resetting said register to all zeros, setting said register to all ones, shifting the contents of said register, setting a data word from said data flow path into said register, and setting a second data word received from said data flow path into said register so as to Exclusive-OR said second word in said register with a first data word already set therein.

4. The combination of claim 3 wherein said register constitutes a result register for providing processing results to said system, and said combination further comprises:

a second register connected to the output of said data flow path and being operative to receive data from said data flow path in response to a gating signal and to OR a second data word received from said data flow path with a first data word in said second register;

funnel gate means in said data flow path including a first gated input means for receiving data signals being transmitted along said data flow path and a second gated input means connected to the output of said second register;

and said control means further includes means connected to said funnel gate means to supply signals thereto and to said result register whereby two data words that have been ORed in said second register can be Exclusive-ORed with the results of the two data words already Exclusive-ORed in said result register, so as to provide the AND function of the two data words, in said result register.

5. A combination of claim 3 wherein said register forms a result register for supplying processing results to said system, and said combination further comprises:

means for arithmetically adding two operands, comprising a second register adapted to receive one of said operands, a third register adapted to receive two operands and Exclusive-OR such operands substantially in parallel with Exclusive-ORing of such operands in said result register, and carry generating means responsive to said contents of second and third registers for generating carries which, when Exclusive-ORed with the partial result in said result register, will form a final sum, and said data flow path includes a funnel gate means having an input means connected to said carry generating means and providing a path for transmitting said carry signals to said result register.

6. The combination of claim 5 further including means connecting said result register to said third register whereby a final sum formed in said result register can be gated into said third register so as to allow accumulated results to be formed in said result register.

7. The combination of claim 4 wherein said data flow path includes a gate means that is operative, in response to a gating signal applied thereto, to transmit data along said path and to provide output signals, in the absence of such a gating signal, representing one bits, said output signals of said gate means being supplied to inputs of said funnel gates, whereby said result register can be set to all ones by utilizing the output signals from said gate means as data.

8. The combination of claim 3, further including:
a second register having input means connected to the output lines of said first register and output lines connected to the input means of said first register whereby the contents of said registers can be selectively shifted therebetween.

9. The combination of claim 8, further including means connected to set said second register selectively to all ones and all zeros, whereby an operand may be set into said first register, said second register may be set to all ones or all zeros, and the contents of the two registers may be swapped.

References Cited

UNITED STATES PATENTS

| | | | |
|---|---|---|---|
| 3,267,460 | 8/1966 | Merrell et al. | 340—172.5 |
| 3,245,040 | 4/1966 | Burdett et al. | 340—172.5 |
| 3,215,938 | 11/1965 | Spencer et al. | 328—43 |
| 3,278,900 | 10/1966 | Wood | 307—221 XR |

GARETH D. SHAW, Primary Examiner

PO-1050
(5/69)

UNITED STATES PATENT OFFICE
CERTIFICATE OF CORRECTION

Patent No. 3,505,648      Dated April 7, 1970

Inventor(s) William McGovern et al

It is certified that error appears in the above-identified patent and that said Letters Patent are hereby corrected as shown below:

Column 24, line 2, the word "od" should read --of--;
Column 24, line 68, the word "inputs" should read --input means--.
Column 25, lines 3-8, should read --9. The combination of claim 8, further including means connected to set said second register selectively to all ones and all zeros, whereby an operand may be set into said first register, said second register may be set to all ones or all zeros, and the contents of the two registers may be swapped.

SIGNED AND
SEALED
AUG 25 1970

(SEAL)
Attest:

Edward M. Fletcher, Jr.
Attesting Officer

WILLIAM E. SCHUYLER, JR.
Commissioner of Patents